(12) United States Patent
Yanase et al.

(10) Patent No.: US 8,654,096 B2
(45) Date of Patent: Feb. 18, 2014

(54) TOUCH SENSOR DEVICE AND ELECTRONIC APPARATUS HAVING THE SAME

(75) Inventors: Jiro Yanase, Kawasaki (JP); Hiroshi Haga, Kawasaki (JP)

(73) Assignee: NLT Technologies, Ltd., Kawasaki (JP)

( * ) Notice: Subject to any disclaimer, the term of this patent is extended or adjusted under 35 U.S.C. 154(b) by 880 days.

(21) Appl. No.: 12/756,685

(22) Filed: Apr. 8, 2010

(65) Prior Publication Data
US 2010/0259503 A1 Oct. 14, 2010

(30) Foreign Application Priority Data

Apr. 10, 2009 (JP) ................................. 2009-095957
Mar. 5, 2010 (JP) ................................. 2010-049430

(51) Int. Cl.
*G06F 3/045* (2006.01)
(52) U.S. Cl.
USPC ........ 345/174; 345/156; 345/173; 178/18.01; 178/18.05; 178/18.06; 178/19.01
(58) Field of Classification Search
USPC ............... 345/76, 77, 82, 156, 173–184, 690; 178/18.01–18.09, 19.01–19.04; 315/169.3
See application file for complete search history.

(56) References Cited

U.S. PATENT DOCUMENTS 4,293,734 A 10/1981 Pepper, Jr.
4,806,709 A * 2/1989 Evans ........................ 178/18.06
2003/0058207 A1* 3/2003 Washio et al. .................. 345/87
2006/0022959 A1* 2/2006 Geaghan ....................... 345/173
2010/0013791 A1* 1/2010 Haga et al. .................... 345/174

FOREIGN PATENT DOCUMENTS

| JP | 56-500230 A | 2/1981 |
|---|---|---|
| JP | 08-146381 A | 6/1996 |
| JP | 3864512 B2 | 3/1999 |
| JP | 2001-099609 A | 4/2001 |
| JP | 2004-535026 A | 11/2004 |
| JP | 2005-269090 A | 9/2005 |
| JP | 2006-106853 A | 4/2006 |
| JP | 2006-527438 A | 11/2006 |
| JP | 2007-264923 A | 10/2007 |
| JP | 2009-042899 A | 2/2009 |

OTHER PUBLICATIONS

Japanese Office Action issued Aug. 20, 2013 in corresponding Japanese Patent Application No. 2010-049430.

* cited by examiner

*Primary Examiner* — Lun-Yi Lao
*Assistant Examiner* — Insa Sadio
(74) *Attorney, Agent, or Firm* — Sughrue Mion, PLLC

(57) ABSTRACT

To provide a touch sensor device and the like, which can improve the detecting accuracy of a surface-capacitive type touch sensor. A touch sensor device of the present invention includes: a touch panel which forms a capacitance between a human body and itself when the human body makes a contact or approaches thereto; a power supply part which has a battery or the like which outputs a DC voltage, converts the DC voltage to an AC voltage, and outputs the AC voltage from the touch panel; a reference potential part to be a reference potential of the AC voltage; a wrist strap and a cable which are electrically connected to the reference potential part and to which the human body makes a contact; and a current detecting part which detects electric currents flown from the power supply part to the human body.

18 Claims, 29 Drawing Sheets

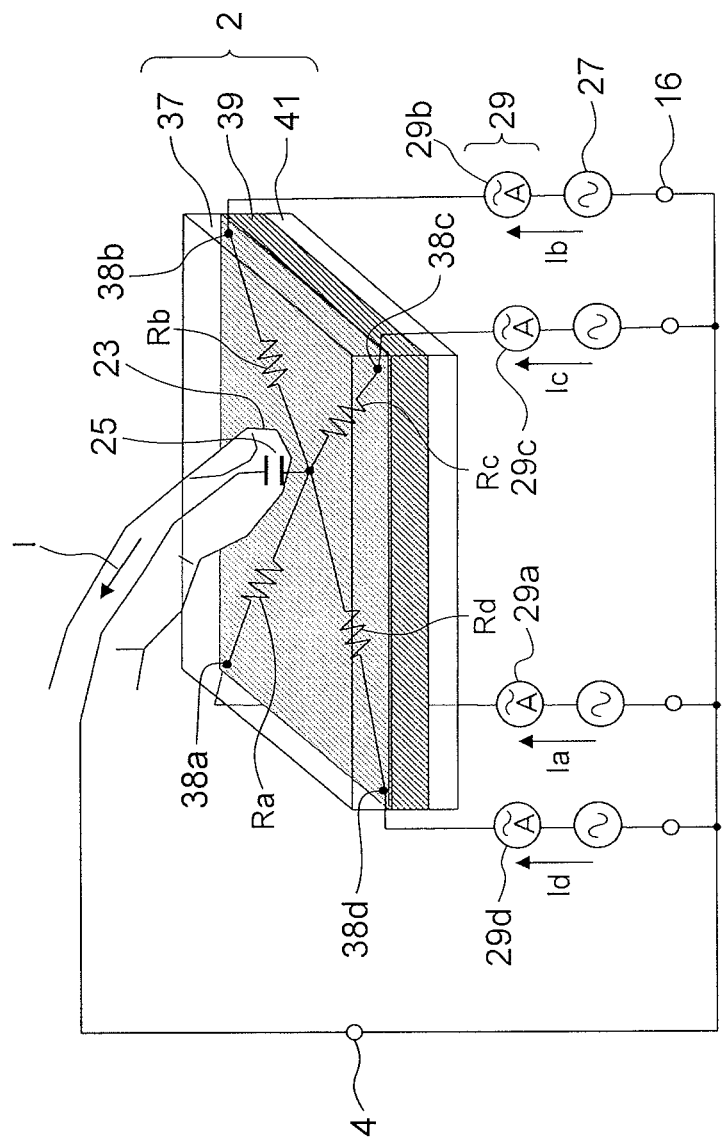

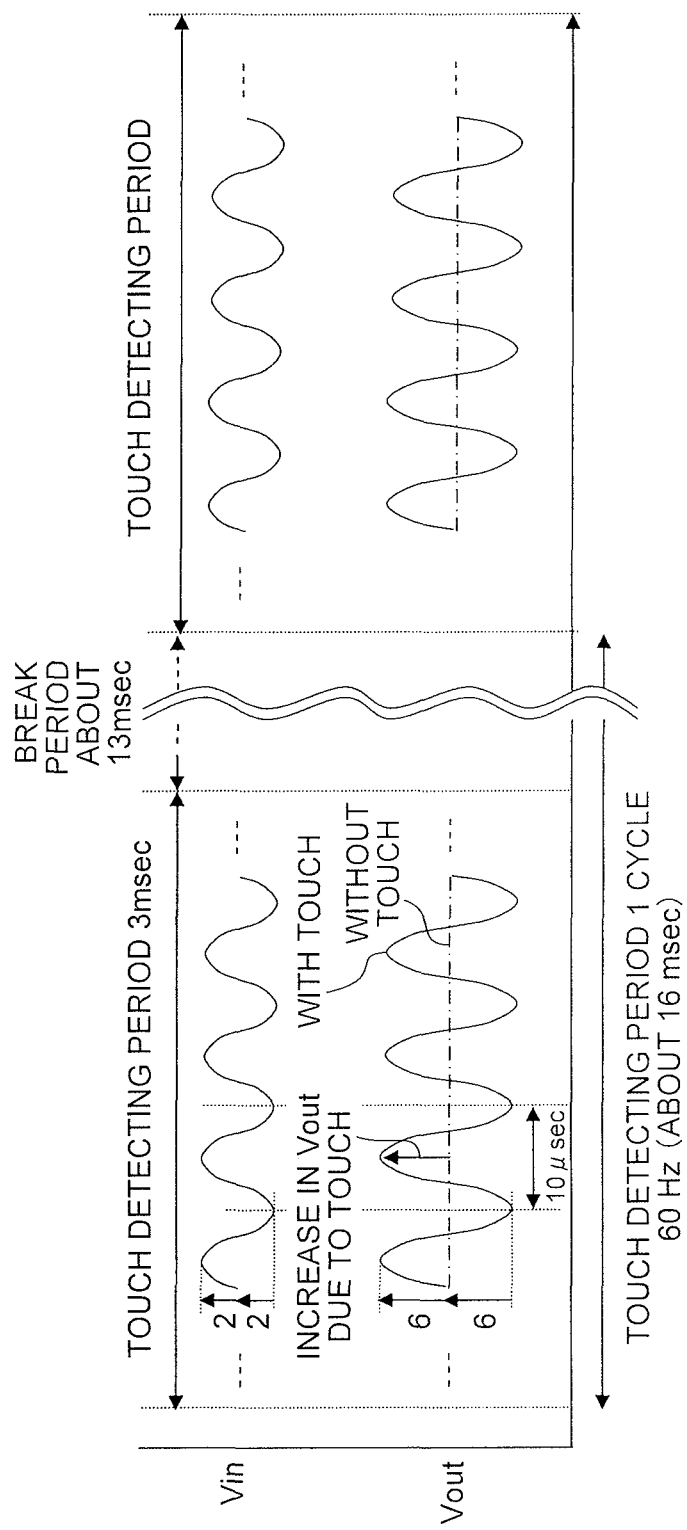

Zp=Za+Zb

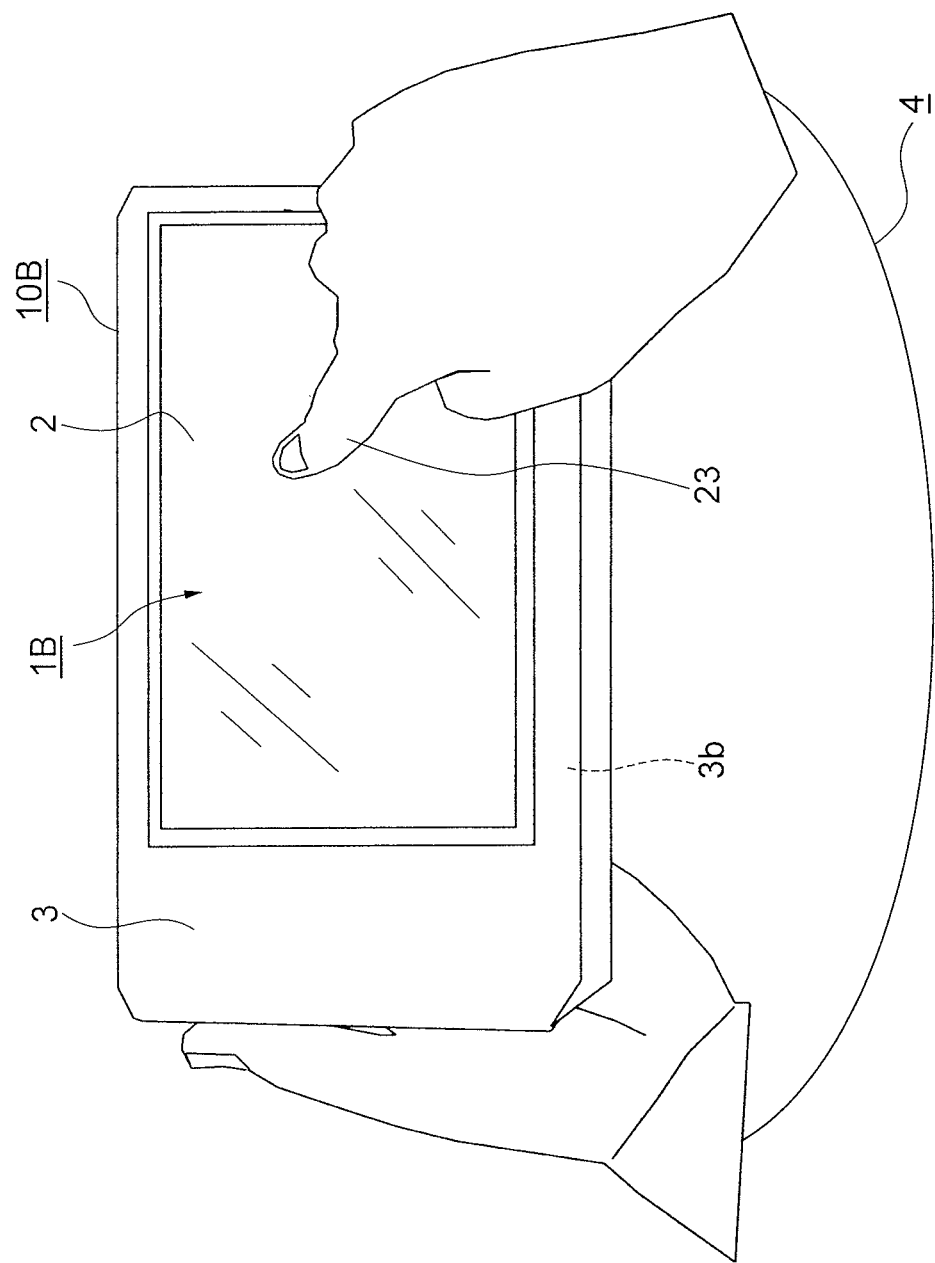

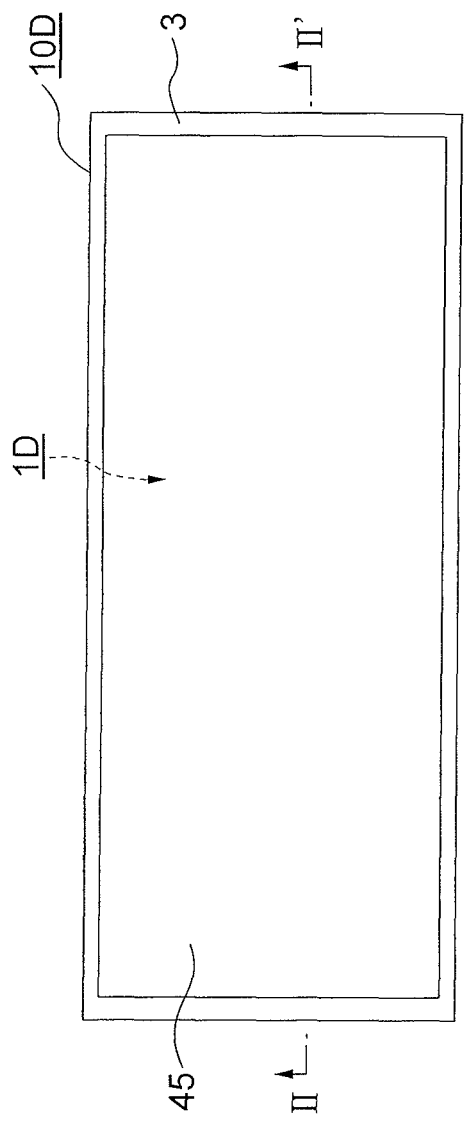
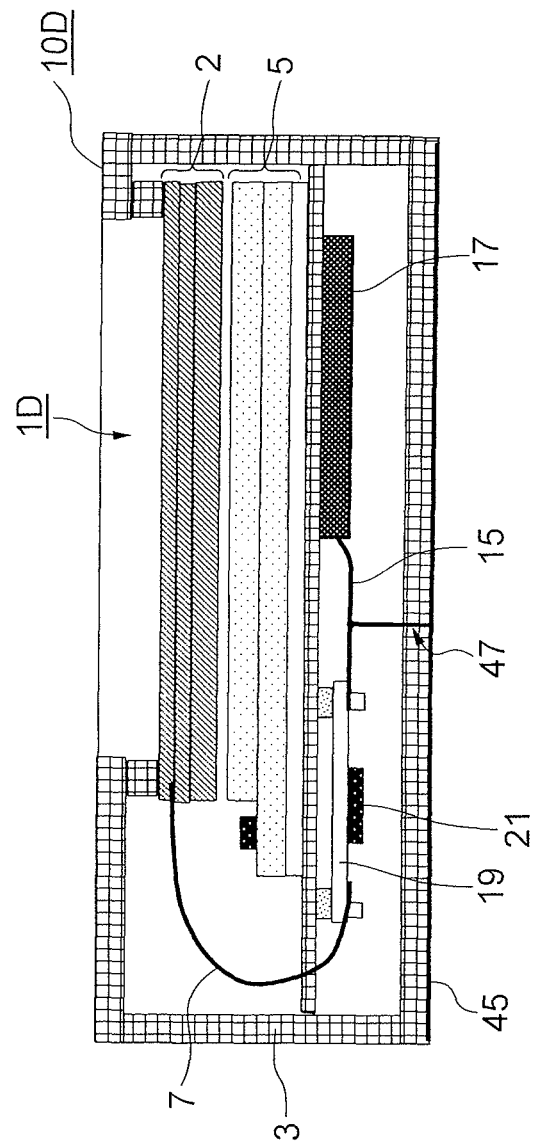
FIG. 11A
FIG. 11B

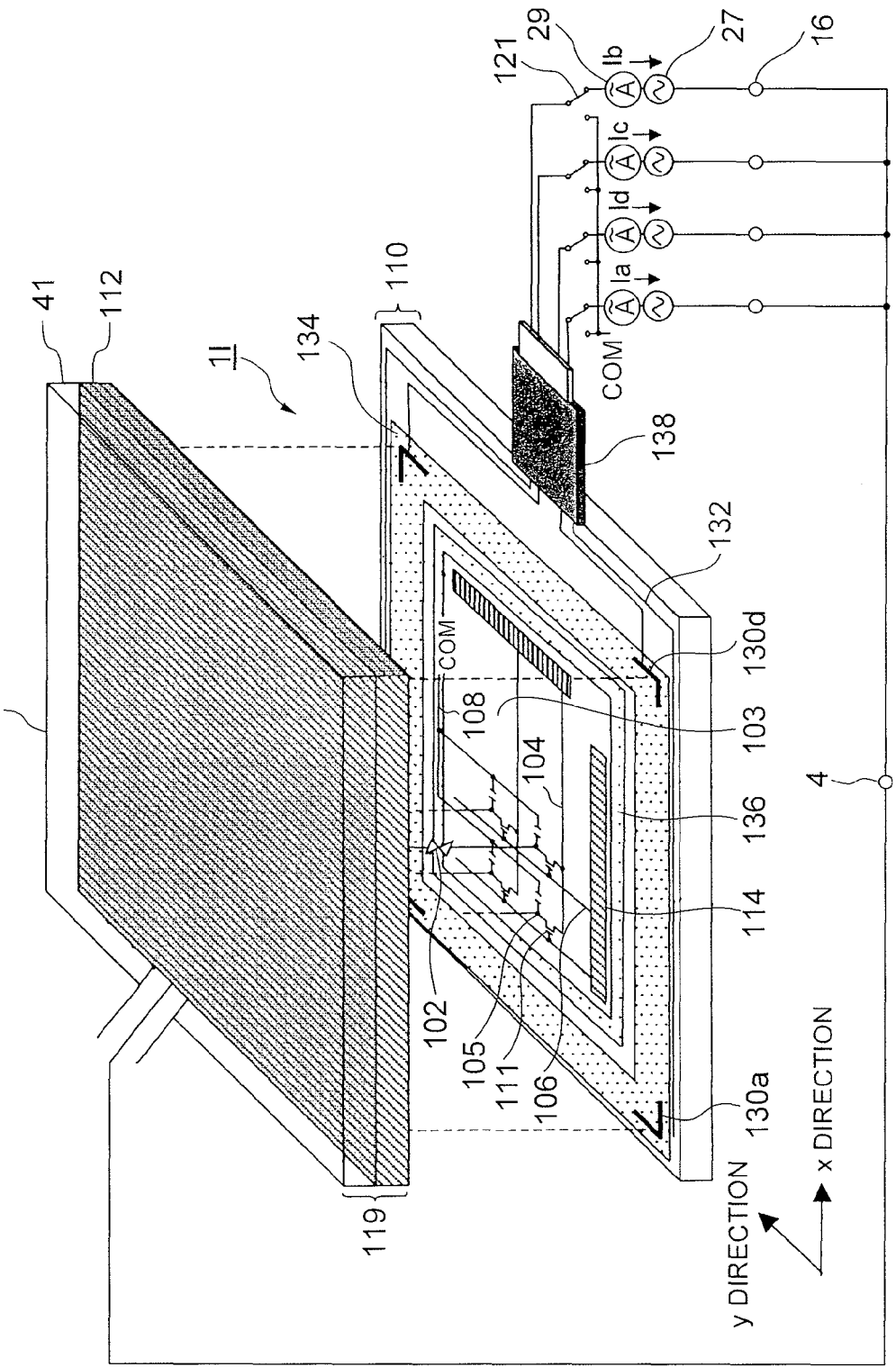

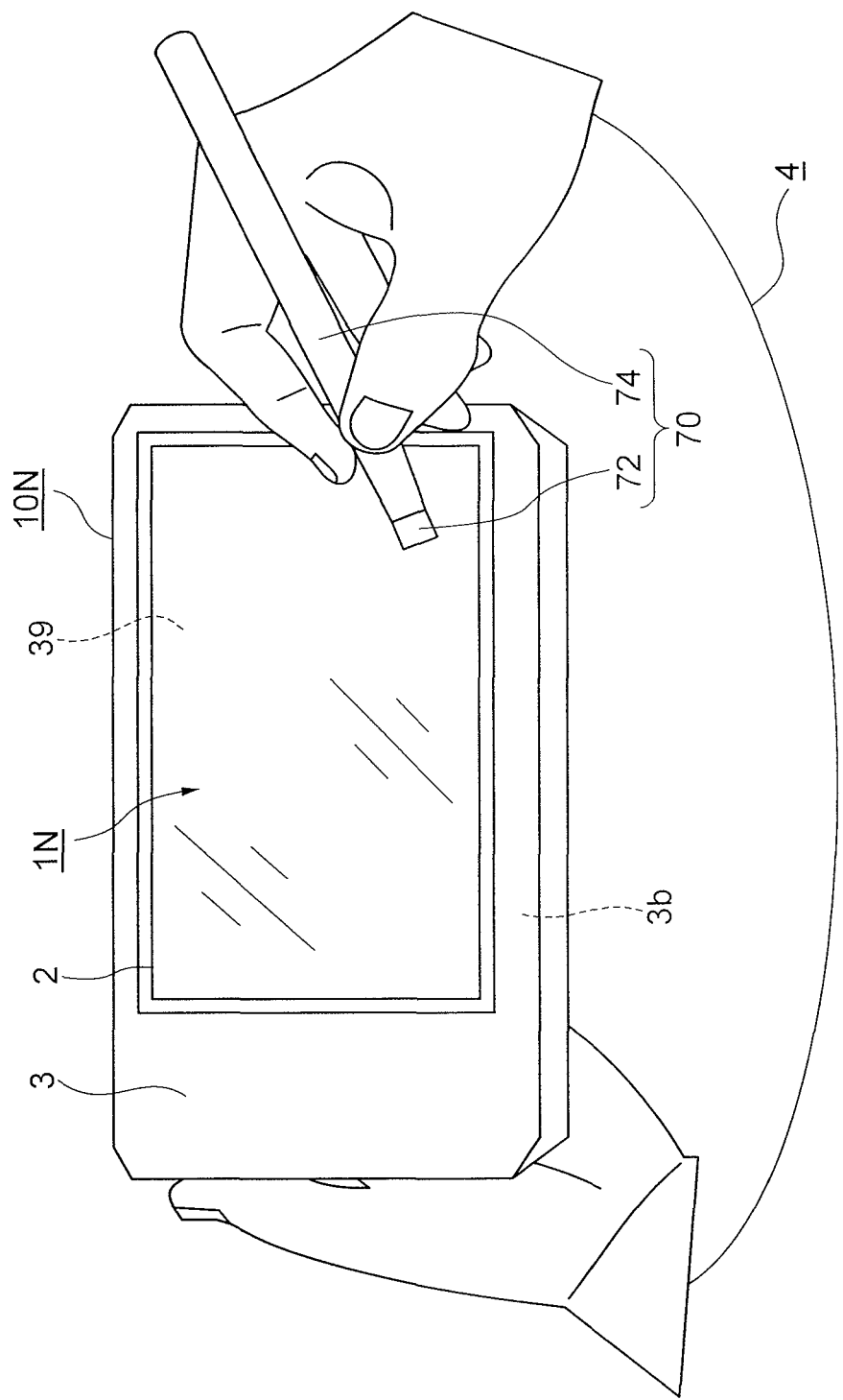

TOUCH SENSOR DEVICE AND ELECTRONIC APPARATUS HAVING THE SAME

CROSS-REFERENCE TO RELATED APPLICATIONS

This application is based upon and claims the benefit of priority from Japanese patent application No. 2009-095957, filed on Apr. 10, 2009 and Japanese patent application No. 2010-049430, filed on Mar. 5, 2010, the disclosure of which is incorporated herein in its entirety by reference.

BACKGROUND OF THE INVENTION

1. Field of the Invention

The present invention relates to a surface-capacitive type touch sensor device and an electronic apparatus and the like having the same.

2. Description of the Related Art

The touch sensor device is a device which detects coordinates of a position pointed by using a finger, a pen, or the like, or detects occurrence of pointing actions. Normally, it is used in combination with a surface display device such as a liquid crystal display (referred to as LCD hereinafter) or a plasma display panel (referred to as PDP hereinafter).

A man-to-machine interface can be achieved by inputting an output of a touch sensor device to a computer, and controlling the display contents of a display device by the computer or by controlling an appliance, for example. Currently, the touch sensor devices are broadly used in daily lives such as with game machines, portable information terminals, ticketing machines, ATMs (Automated Teller Machines), car navigation systems, and the like. In accordance with improvements in the performance of computers and spread of network connecting environments, services provided with electronic apparatuses have been diversified. Accordingly, there are more and more increasing demands for display devices having the touch sensor device.

As types of the touch sensor devices, known are a capacitive type, a resistance film type, an infrared type, an ultrasonic type, an electromagnetic induction type, and the like. Among the touch sensor devices, the capacitive-type touch sensor device can detect touches of fingers through glass and plastics in various thicknesses, thereby exhibiting solid quality in many application fields such as in industrial products, white goods, and the like. Note, however, that the items used for touching the sensor are limited to fingers and electrostatic conductive items forming a capacitance equivalent to the fingers.

The capacitive-type touch sensor device is further classified into a projected capacitive type and a surface capacitive type.

The projected capacitive type is a type which is formed by disposing X-Y transparent electrodes in matrix. When a finger approaches to the X-Y transparent electrodes, the capacitance between the electrodes increases. A controller detects the change in the capacitance on the X-Y line, and detects the position of the finger.

In the meantime, the projected capacitive type has XY electrodes on both sides of a glass substrate. In order to form the transparent electrodes on both sides of the glass substrate, it is necessary to deposit two layers of transparent conductive layers. In addition, it is necessary to pattern the conductive transparent layers for forming the transparent electrodes in a matrix form, which requires a large number of manufacturing steps. Further, in addition to having a large number of XY electrodes, terminals corresponding to each of the XY electrodes are required. Thus, the number of terminals becomes great as well.

Further, a typical material for transparent electrodes is ITO (indium tin oxide). Because of expansion in the liquid crystal panel and touch panel markets, there have been increasing demands for ITO. In particular, indium that constitutes ITO is a rare metal, which is expensive. Further, ITO is formed by vapor deposition, so that a long manufacturing tact time is required. Thus, it is not possible to be mass-produced. Therefore, ITO film makers cannot increase enough production of the films, and there is a short-supply of ITO films. This results in increasing the price for members of transparent electrodes. As a result, the manufacturing cost of the projected capacitive type is increased.

In the meantime, the surface type simply needs to form one layer of transparent conductive layer on the surface of an insulating substrate as described later, so that the structure is simpler and the manufacturing cost can be suppressed compared to the case of the projected capacitive type.

That is, a typical surface type is formed with an insulating substrate, a uniform transparent conductive layer formed on the surface thereof, and a thin insulating layer (protective layer) formed on the top surface thereof. When driving the touch sensor device, an AC voltage is applied to the four corners of the transparent conductive layer. When a finger touches the touch sensor, a small current flows to the finger via a capacitance formed between the transparent conductive layer and the finger. This current flows to the point touched by the finger (the point contacted by the finger) from each of the four corners of the transparent conductive layer. Then, a signal processing circuit detects occurrence of the touch from the sum of each of the currents. Further, the signal processing circuit calculates coordinates of the touched position from the ratio of each of the currents. For example, the techniques regarding such surface type are disclosed in U.S. Pat. No. 4,293,734 (Patent Document 1), Japanese Patent Application Publication Sho 56-500230 (Patent Document 2), Japanese Unexamined Patent Publication 2001-099609 (Patent Document 3), Japanese Unexamined Patent Publication 2005-269090 (Patent Document 4), Japanese Unexamined Patent Publication 2007-264923 (Patent Document 5), and Japanese Patent No. 3864512 (Patent Document 6).

However, there are following issues with the surface-capacitive type touch sensor device.

In a case where a surface-capacitive type touch sensor device is mounted to a portable device, i.e., under a mobile environment, deterioration in S/N (signal-to-noise ratio) of a touch sensor function for detecting the contact positions results in degradation in the sensitivity and positioning accuracy of the touch sensor function. Further, the contact sensitivity and position detecting accuracy are susceptible to changes in the surrounding environments.

It is therefore an exemplary object of the present invention to provide a touch sensor device and the like capable of improving the position detecting accuracy of a surface-capacitive type touch sensor device.

SUMMARY OF THE INVENTION

The touch sensor device according to an exemplary aspect of the invention includes:
a first human body contact part which forms a capacitance between a human body and the first human body contact part itself when the human body makes a contact or approaches thereto;

a power supply part which outputs an AC voltage to the first human body contact part;

a current detecting part which detects a current flown from the power supply part to the human body;

a reference potential part to be a reference potential of the AC voltage; and a second human body contact part which is electrically connected to the reference potential part and to which the human body makes a contact.

BRIEF DESCRIPTION OF THE DRAWINGS

FIG. 3 is an equivalent circuit diagram showing the touch sensor device of the first exemplary embodiment;

FIG. 4 is a graph showing voltage waveforms of actions executed in the touch sensor device of the first exemplary embodiment;

FIG. 8 is a perspective view showing a portable device to which a touch sensor device according to a second exemplary embodiment is loaded;

FIG. 11A is a plan schematic view (back face side) showing a portable device to which a touch sensor device according to a fourth exemplary embodiment is loaded, and FIG. 11B is a cross-sectional schematic view taken along a line II-II' of FIG. 11A;

FIG. 17 is an exploded perspective view showing an LCD having a touch sensor of a tenth exemplary embodiment built therein;

FIG. 28 is a perspective view showing a portable device to which a touch sensor device according to a fifth exemplary embodiment is loaded.

DETAILED DESCRIPTION OF THE EXEMPLARY EMBODIMENTS

Figure 1:
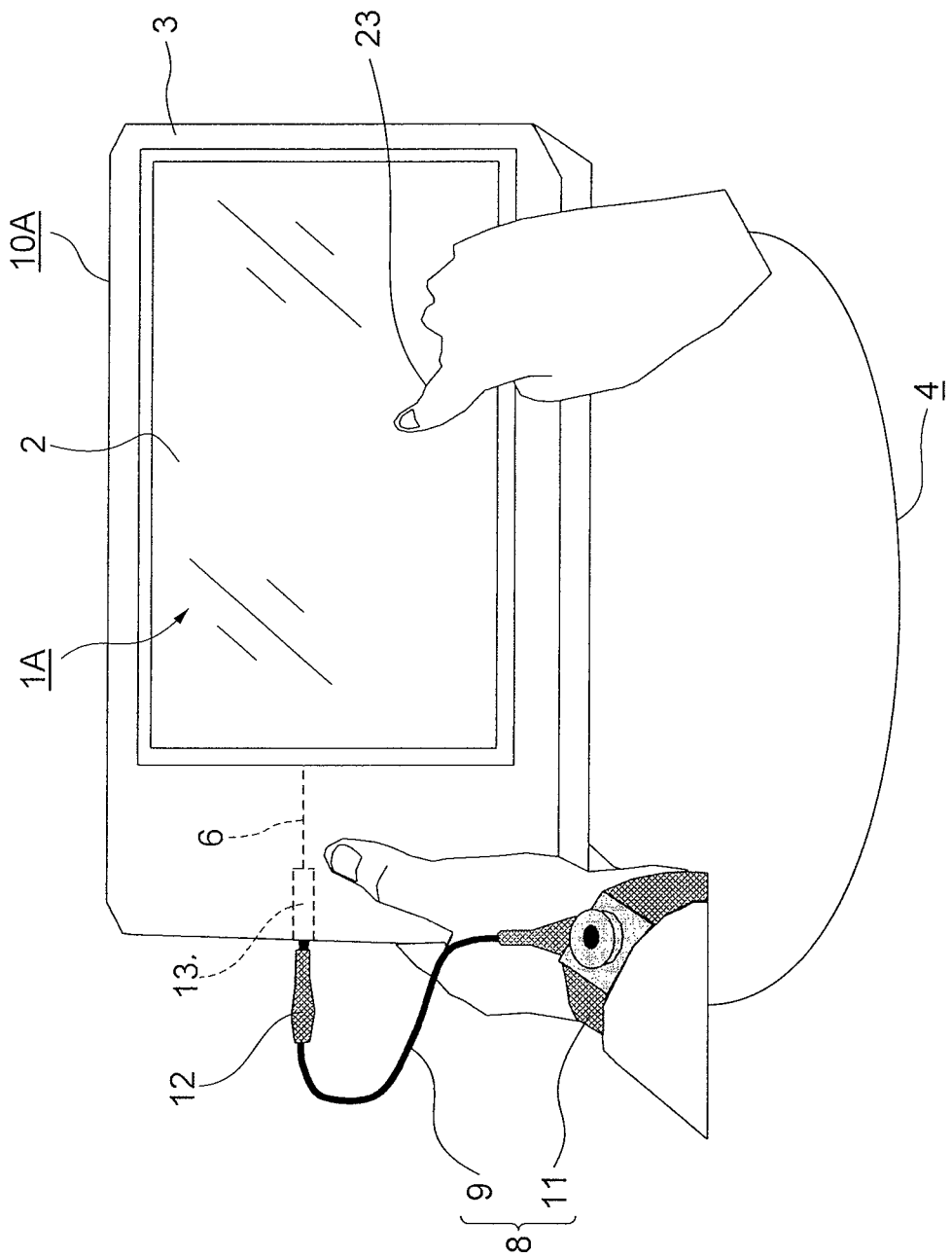
FIG. 1 is a perspective view showing a portable device to which a touch sensor device according to a first exemplary embodiment is loaded.

The inventors of the present invention actually fabricated a surface-capacitive type touch sensor device, and found the substantial issues when it was employed for portable (mobile) use. While details thereof are described in following exemplary embodiments, the issue can be summarized as follows. That is, under mobile environments, S/N (signal-to-noise ratio) of the touch sensor function is deteriorated, thereby degrading the detection sensitivity (may be simply referred to as sensitivity hereinafter) and the positioning accuracy. Further, when there is a change in the surrounding environments, the sensitivity and the positioning accuracy are prone to be affected by the change.

A first reason thereof is that a reference potential node of a circuit is floated from the earth, so that signal components generated by a touch are reduced due to the influence of first parasitic impedance formed between the reference potential node of the circuit and the earth. The reason the reference potential node of the circuit is floated from the earth in a case of a portable device or the like is that the reference potential node of the circuit is not connected to the earth, since the power is normally supplied from a built-in battery without connecting a power supply plug to an AC socket. Thus, the change in the surrounding environments is a change in the impedance between the reference potential node of the circuit and the earth. Particularly, the reference potential node of the circuit is normally covered inside a casing. Thus, when the casing is of insulating characteristic, the impedance between the reference potential node of the circuit and the earth becomes particularly high.

A second reason is that human body is floated from the earth, so that signal components generated by a touch are reduced due to the influence of second parasitic impedance formed between the human body and the earth. The reason the human body is floated from the earth is that the human body is not earthed in normal lives. The second parasitic impedance is connected in series to the first parasitic impedance, and it tends to change in accordance with the change in the surrounding environments as in the case of the first parasitic impedance.

That is, the detection currents are decreased due to the presence of the first and second parasitic impedance, and the first and second parasitic impedance (floating impedance) is unstable. Therefore, the sensitivity and the positioning accuracy are degraded.

In order to overcome the above-described issues, the present invention is a surface-capacitive type touch sensor function which is characterized to include an impedance face, a current detecting circuit electrically connected to the impedance face, a device driven by a battery, and a device for connecting a reference potential node of the current detecting circuit and a human body with low impedance. Here, it becomes possible to ignore the impedance between the reference potential node of the current detecting circuit and the earth and the impedance between the human body and the earth through connecting the reference potential node of the current detecting circuit and the human body. The impedance between the reference potential node and the earth may be capacitive impedance.

With the present invention, deterioration of S/N of the signals generated by touches under mobile (portable device use) environments can be suppressed by electrically connecting the reference potential of the circuit with the human body with low impedance. Therefore, even under mobile environments, it is possible to provide the touch sensor function that is excellent in the sensitivity and the positioning accuracy. The reason is as follows. That is, since the human body is conductive, the floated circuit reference potential node of the portable device can be made the same potential as that of the contact part by connecting the reference potential node with the human body with low impedance. Details of the reasons and operations for acquiring the above-described effects will be described later along with the exemplary embodiments. Hereinafter, a plurality of examples of preferable embodiments of the present invention will be described in detail by referring to the accompanying drawings.

(First Exemplary Embodiment)

Figure 2:
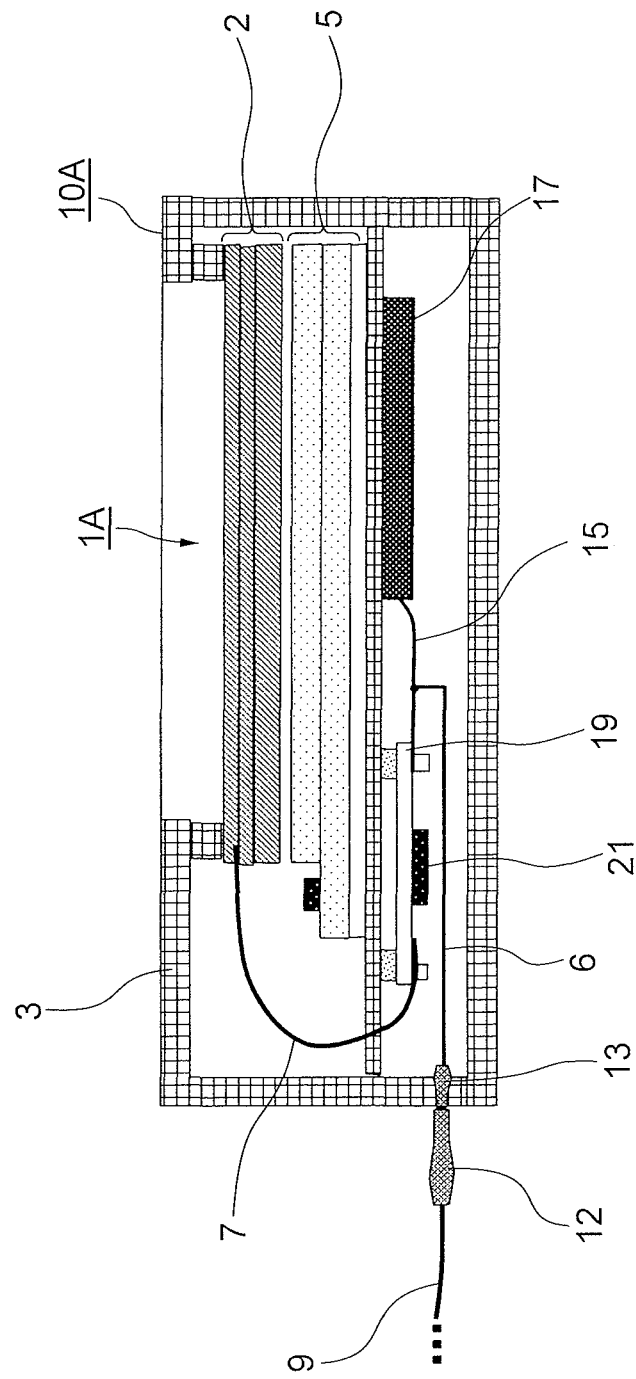
FIG. 2 is a cross-sectional schematic view of the portable device shown in FIG. 1.

FIG. 1 is a perspective view showing a portable device to which a touch sensor device according to a first exemplary embodiment is loaded. FIG. 2 is a cross-sectional schematic view of the portable device shown in FIG. 1. FIG. 3 is an equivalent circuit diagram showing the touch sensor device of the first exemplary embodiment. Explanations will be provided hereinafter by referring to FIG. 1-FIG. 3.

A touch sensor device 1A of the first exemplary embodiment includes: a first human body contact part (2) which forms a capacitance 25 between a human body 4 and itself when the human body 4 touches or approaches thereto; a power supply part (27) which outputs an AC voltage to the first human body contact part (2); a current detecting part (29) which detects electric currents flown from the power supply part (27) to the human body 4; reference potential parts (15, 16) which are the reference potentials of the AC voltage; and a second human body contact part 8 which is electrically connected to the reference potential parts (15, 16) and to which the human body 4 makes contacts.

Contacts between the second human body contact part 8 and the human body 4 herein includes not only a case of direct contact but also a case of contact made via low impedance such as capacitance and a case of indirect contact made via a conductive member. A specific example of a case where a human body makes a contact with the second human body contact part via low impedance may be a case where a conductive casing (when the second human body contact part is the conductive casing) is covered by a thin insulating film, for example.

Further, "reference potential part" means a ground (GND) of a circuit, and "earth" means the solid earth ground, and "grounding" means to connect to the solid earth ground. Therefore, the potential of the reference potential part and the potential of the earth are not necessarily the same.

In a touch sensor device of a related technique, an electric current flows in a closed loop of power supply part→human body contact part→human body→parasitic impedance→earth (grounded potential)→parasitic impedance→reference potential part, and this current is detected. However, the accuracy for detecting the currents is deteriorated due to the facts that the currents are not easily flown because voltage drop in the parasitic impedance is large, the unstable parasitic impedance becomes fluctuated by the influences of the surroundings, and the like. In the meantime, in the touch sensor device 1A, an electric current flows in a closed loop of power supply part (27)→first human body contact part (2)→human body 4→second human body contact part 8→reference potential parts (15, 16), and this current is detected. Since no parasitic impedance is contained in the closed loop, the electric currents can be increased, and the fluctuations in the parasitic impedance as well as the influences of the noise can be suppressed. Therefore, the accuracy for detecting the electric currents can be improved.

The first human body contact part (2) includes: an impedance face (39) which is formed with a conductive film to which the human body 4 contacts or approaches; and a plurality of electrodes 38a-38d which are provided to the impedance face 39 and to which the AC voltage is applied. The current detecting part (29) includes a plurality of current detecting circuits 29a-29d which respectively detect the currents flowing in the plurality of electrodes 38a-38d. The power supply part (27) includes a battery 17 which outputs a DC voltage, converts the DC voltage to the AC voltage, and outputs it from the first human body contract part (2).

The touch sensor device 1A is mounted into an electronic device (10A). The second human body contact part 8 includes a conducting wire (9) connected to the reference potential parts (15, 16), and a conductor (11) which is connected to the conducting wire (9).

In the first exemplary embodiment, the electronic device (10A) is achieved by a portable device 10A, the first human body contact part (2) is achieved by a touch panel 2, the impedance face (39) is achieved by a transparent conductive layer 39, the power supply part (27) is achieved by an AC voltage supply 27, the reference potential parts (15, 16) are achieved by a reference potential wiring 15 and a reference potential node 16, the current detecting part 29 is achieved by current detecting circuits 29a-29d, the conducting wire (9) is achieved by a cable 9, and the conductor (11) is achieved by a wrist strap 11, respectively. Hereinafter, more detailed explanations will be provided.

(Explanations of Structures)

As shown in FIG. 2, in general, the portable device 10A has a battery 17 loaded thereon, and the reference potential node 16 of the circuit is not connected to the earth (grounded potential) via an AC socket. Note here that "reference potential node is a node of the ground (GND), which is a potential of 0 V on the circuit. Further, "AC (Alternating Current) socket" is an outlet for power supply to which plugs of electronic apparatuses such as home electric appliances are inserted. Regarding AC sockets for single-phase alternating current of 100V used in Japan, mostly used ones are the type with two thin and long outlets formed therein. One of the outlets is the earth. There is also a type of socket with an earth, which has a round-shape outlet for a grounding pole.

As shown in FIG. 2, the top face of the periphery of the touch panel 2 and the inside a casing 3 of the portable device 10A are glued to support the touch panel 2. The material of the casing 3 is plastic. Plastic is made with a polymer compound, and it has plasticity and is an insulator. Further, an LCD 5 as a display device is provided on the lower side of the touch panel 2. In FIG. 2, the touch panel 2 and the LCD 5 are provided by being isolated from each other. However, the LSD 5 and the touch panel 2 may be laminated with each other through laminate processing or the like by using an adhesive film. In that case, there is no air layer formed between the LCD 5 and the touch panel 2. This is advantageous since the transmittance of light from the LCD 5 to the touch panel 2 can be increased.

The LCD 5 is thinner and lighter than the other display devices such as CRT (Cathode Ray Tube) and PDP, so that it is suited to be loaded onto portable devices. A liquid crystal panel used for the LCD 5 is formed by inserting liquid crystal between two glass plates, and it is structured to display images by increasing and decreasing light transmittance through changing the alignments of the liquid crystal molecules by applying voltages. In order to illuminate the liquid crystal, a backlight is provided on the back face of the liquid crystal panel. The two glass substrates are normally a TFT (thin film transistor) substrate and a counter substrate. While a case of transmissive-type LCD which displays images by modulating light of the surface backlight from the back face with the liquid crystal panel, it is also possible to employ a reflective-type LCD which uses peripheral light for display by forming a metal electrode as a reflection plate on the TFT substrate described above. Further, it is possible to employ a transflective-type LCD which can be used both as the transmissive type and as the reflective type, through forming minute holes on the reflection plate in a net-like form.

As the touch panel 2, used is a panel which is obtained by forming a transparent conductive layer 39 on an insulating substrate 41 by sputtering or the like. The material of the transparent conductive layer 39 is ITO (Indium tin oxide). The thickness of the transparent conductive layer 39 is set as 10-300 nm, and the sheet resistance thereof is set as 100-1000Ω.

Since the touch panel 2 on which the transparent conductive layer 39 (FIG. 3) is formed is isolated from a main substrate 19, a wiring (FPC 7) for transmitting electric signals is formed. In this case, there are areas where the wirings and substrates need to be bent due to spatial restrictions, so that flexible printed circuits (referred to as FPC hereinafter) are used. The FPC 7 is a printed board capable of changing the shape because of its flexibility, which is structured by forming an adhesive layer on an film-type insulating substrate of 12-50 μm in thickness, and further forming a conductor foil of about 12-50 μm in thickness. An insulator is placed over the FPC 7 other than the terminal part and the solder part for protection.

Terminal parts (electrodes 38a-38d: FIG. 3) of the FPC 7 are connected respectively to the four corners of the transparent conductive layer 39 via a conductive adhesive material such as an anisotropic conductive film (ACF). Alternatively, electrodes made with a metal may be formed at the four corners of the transparent conductive layer 39. In that case, the metal is preferable to be of a material whose contact resistance to ITO is low, e.g., silver, titanium. Further, it is possible to form a wiring made with a metal, and it may be drawn around the outer periphery of the transparent conductive layer 39.

Further, an insulating protective layer 37 for covering the transparent conductive layer 39 is formed. The thickness of the protective layer 37 is set as 0.1-1 mm to increase the solidness while forming a sufficient capacitance 25 between the transparent conductive layer 39 and a finger 23 that touches the layer.

One of the terminal parts of the FPC 7 extracted out from the transparent conductive layer 39 is connected to the input side of a controller 21 for the touch sensor device 1A via a connector on the main substrate 19. The main substrate 19 is connected to an LCD module formed with the liquid crystal panel, the backlight, and the like via a connector (not shown). The battery 17 is connected to the main substrate 19 without a connector. Between the battery 17 and the main substrate 19, wirings of positive supply voltage from +3V to +15V, negative supply voltage from −15V to −3V, and reference voltage of 0V are connected.

For the battery 17, a lithium ion secondary battery is used. With the lithium ion secondary battery, the lithium ions in the electrolyte carry out electric conduction. Further, the lithium ion secondary battery does not contain metal lithium within the battery, and it can be repeatedly used by being charged. It is also possible to use a lithium polymer secondary battery in which polymer is used for the electrolyte. As the battery 17, any types of batteries such as a storage battery, a dry battery, a solar battery, a fuel battery, and the like can be used, as long as it is the battery that can individually supply power.

Further, the main substrate 19 is formed with a surface packaging board, to which a chip having a micro controller and a flash memory built therein, an interface IC for display, a power control IC, a controller 21 for the touch sensor device 1A, a chip having the main functions of an oscillation circuit IC, and the like are mounted. Alternatively, the main substrate 19 may be mounted on a thin-type printed board having the controller 21 provided on the FPC 7 or the like.

The reference potential nodes 16 of each chip (FIG. 3) are put together, and connected to the reference potential wiring 15 supplied from the battery 17.

FIG. 3 is an equivalent circuit diagram regarding the function of the touch sensor device 1A. The controller 21 for the touch sensor device 1A is formed with four current detecting circuits 29a-29d and the like, which are electrically connected to the four corners of the transparent conductive layer 39, respectively, via electrodes 38a-38d. Further, the output terminal (AC voltage supply 27) of the oscillation circuit IC is electrically connected to the four corners of the transparent conductive layer 39. Note here that the AC voltage is of a sine wave, the amplitude thereof is set as 0.5-2 V, and the frequency thereof is set as 20-200 kHz.

The current detecting circuits 29a-29d are formed with a current-voltage converting circuit as a preceding stage and an AC-DC converting circuit as a following stage (not shown). The output terminal of the AC-DC converting circuit is inputted to an analog-digital converting circuit that is built into the micro controller. The analog-digital converting circuit includes a sample hold circuit. A program exclusively used for the touch sensor function is built-in inside a mount system of the portable device 10A, and the touch sensor function is controlled by the micro controller.

Referring to FIG. 2, the reference potential wiring 15 on the main substrate 19 and a jack 13 provided in a part of the casing 3 of the portable device 10A are connected via a cable 6. Referring to FIG. 1, the cables 6 and 9 are formed by elongating a conductor such as a metal into a wire form. And the cables are covered by an insulator for protection having the conductor as the core except the end part. A terminal such as the jack 13 is also provided to the outside of the casing 3, and a plug 12 such as a banana plug is provided to the end of the cable 9 of the wrist strap 11.

Alternatively, the external terminal of the casing 3 may be formed as a pin or the like, and it may be connected by being pinched by an alligator clip provided to the end of the cable 9 of the wrist strap 11. The material of the conductive part of the banana plug or the alligator clip is gold-plated. Further, the wrist strap 11 is a band with high elasticity having a conductive fiber weaved into a part that is wrapped around the wrist of the human body 4. The wrist strap 11 has a surface fastener to be detachable, thereby making it possible to be worn securely by a push hook while making it possible to be detached easily.

When there is a large potential difference between the human body 4 and the jack 13 in a case where the wrist strap 11 and the jack 13 of the casing 3 are connected via the cable 9, there is a concern that the current flown into the human body 4 becomes increased. Thus, a current restricting register of 100 k-10 MΩ may be built-in to the cable 9.

As another specific example of the second human body contact part, an earphone or a headphone may be used as well. The earphone is used by being inserted into an ear, and the headphone is used by being placed over both ears. The earphone and the headphone are devices which convert electric signals outputted from the portable device into sound waves by using a speaker near the ear. Normally, these are formed to be capable of being separated from the device by using connectors (the jack 13, the plug 12, and the like). For example, for the earphone and the headphone, not only the conducting wire for carrying the electric signals regarding the sound waves but also the reference potential wiring 15 of the circuit is let through the inside the cable 9 to have the part that comes to be in contact with the ear and the human body near the ear to be conductive.

As another specific example of the same, a strap may be used as well. A strap is used by being wrapped around a wrist or the like for preventing fall of the portable device, since the portable device is of a considerable weight and easily damaged by impacts. Further, there are a short strap and a neck strap as the kinds of the straps. Most of the short straps are worn around a wrist or a finger, whereas the neck strap is worn around a neck. A thin loop is inserted into a strap hole provided to the portable device. The strap hole part and the reference potential wiring 15 of the circuit are connected, and the human body and the strap are electrically connected by using the strap to which a conductive fiber is woven. In this manner, the reference potential node 16 of the circuit is connected to the human body via the conductive strap.

(Explanations of Action)

Next, actions of the touch sensor device 1A according to the first exemplary embodiment will be described in detail by referring mainly to FIG. 3.

A sine wave is applied to the transparent conductive layer 39 from the AC voltage supply 27, and the transparent conductive layer 39 is kept to have a uniform voltage. When the finger 23 touches the surface of the protective layer 37, the capacitance 25 of 5-50 pF is formed between thee human body 4 and the transparent conductive layer 39 via the protective layer 37. Further, since the human body 4 is conductive, the capacitance 25 formed by the touch of the finger 23 is connected to the potential of the human body 4.

Since the power of the portable device 10A is supplied from the battery 17, naturally, the portable device 10A is not connected to the AC socket by a power code. Thus, the reference potential node 16 of the circuit is not connected to the earth via the AC socket. Therefore, in that state, the reference potential node 16 of the circuit is floated with respect to the earth.

Here, as shown in FIG. 1, the conductive wrist strap 11 is set to the left wrist of the operator, and the plug 12 of the cable 9 of the wrist strap 11 is inserted to the jack 13 of the casing 3 of the portable device 10A. The jack 13 is connected to the reference potential wiring 15 of the circuit inside the casing 3, so that the reference potential node 16 of the circuit is electrically connected to the human body 4. As described above, the human body 4 is conductive, so that the floated circuit reference potential node 16 is the potential of the human body 4. Therefore, the reference potential node 16 of the circuit can be fixed to a constant potential even if the power code is not inserted to the AC socket.

Referring to FIG. 3, there is formed a closed circuit in which the reference potential node 16 of the circuit and the capacitance 25 are connected to the human body 4, and a weak current (current generated due to the touch) flows to the touching finger 23 via the transparent conductive layer 39. Note here that in the transparent conductive layer 39, resistances from the position corresponding to the touch to respective corners are defined as Ra-Rd. As described above, since the capacitance 25 according to the touch is 5-50 pF and the frequency of the AC voltage supply 27 is 20-200 kHz, the impedance of the capacitance 25 according to the touch is several hundreds of kΩ. In the meantime, the sheet resistance of the transparent conductive layer 39 is 100-1000Ω, and the resistance from a corner to a corner (one side) of the transparent conductive layer 39 is several kΩ, for example, even though it depends on the size of the touch panel 2. Therefore, the impedance of the capacitance 25 according to the touch is higher than the resistance of the transparent conductive layer 39 by three digits or more. Thus, the dominant impedance in the closed circuit is the capacitance 25 generated according to the touch, and it can be seen that the amount of the current generated according to the touch depends on the capacitance 25 generated by the touch and the amplitude of the AC voltage supply 27.

The current generated by the touch is divided as currents Ia-Id to the current detecting circuits 29a-29d, respectively, via the transparent conductive layer 39. The ratio of the currents Ia-Id changes in accordance with the resistances Ra-Rd of the transparent conductive layer 39, and the resistances Ra-Rd change depending on the position of the finger 23 touched on the touch panel 2.

Further, examples of arithmetic calculations regarding the touch position are as follows.

$$x = k1 + k2 \cdot (Ib + Ic)/(Ia + Ib + Ic + Id) \quad \text{(Expression 1)}$$

$$y = k1 + k2 \cdot (Ia + Ib)/(Ia + Ib + Ic + Id) \quad \text{(Expression 2)}$$

Here, x is an x-coordinate of the touch position, y is a y-coordinate thereof, and k1 and k2 are constants.

Furthermore, the currents Ia-Id are the currents detected by the current detecting circuits 29a-29d shown in FIG. 3. That is, the current Ia is a current detected by the current detecting circuit 29a, the current Ib is a current detected by the current detecting circuit 29b, the current Ic is a current detected by the current detecting circuit 29c, and the current Id is a current detected by the current detecting circuit 29d, respectively.

Next, more detailed explanations will be provided by referring to FIG. 4-FIG. 7 in addition to FIG. 1-FIG. 3.

FIG. 4 shows voltage waveforms of the actions done by the touch sensor device according to the first exemplary embodiment. Referring to FIG. 4, the touch detecting period of is set as 3 msec and the frequency of the touch detecting period is set as 60 Hz. One cycle is roughly 16 msec. However, the touch detecting period is 3 msec, so that roughly the remaining 13 msec is taken as a break period.

Vin shown in FIG. 4 is an output waveform of the AC voltage supply 27, and Vout is an output waveform of the current-voltage converting circuit. Note here that the frequency of Vin is set as 100 kHz, and the amplitude thereof is 2 V. The amplitude of Vout is almost 0 V when there is no touch, while the amplitude of Vout is 6 V when there is a touch. Like this, there is a clear voltage change depending on whether or not there is a touch. The output of the current-voltage converting circuit is an AC voltage, so that the AC voltage is converted to a DC voltage by the AC-DC converting circuit of latter stage. Further, the DC voltage output of the AC-DC converting circuit is an analog signal, so that the analog signal is converted to a digital signal by the analog-digital converting circuit of latter stage.

Note here that a sampling rate is set as 1 k-200 k sample/sec, and the vertical resolution is set as 8-16 bits. When the signal inputted to the control terminal of a sampling hold circuit changes from Low to High, sampling is started. The cycle of this pulse signal is set as 60 Hz. Through signal-processing the converted digital signal by the micro controller, detection of a touch, arithmetic calculation of the touch position, and a mouse event on an operating system are executed. In this manner, the processing from the analog-digital conversion to the mouse event is executed with 60 Hz. As described, automated operations can be done by the controls of the micro controller.

Figure 5A:
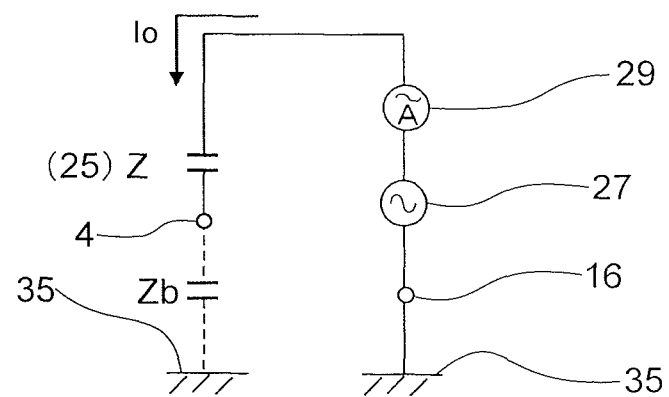
FIG. 5A is an equivalent circuit diagram showing a typical operation principle of a surface-capacitive type touch sensor device.

Next, details of the issues of the first embodiment and the reasons as well as the operations for achieving the effects of the first embodiment will be described. For conveniences' sake, explanations are provided by referring to a case of a capacitance switch which detects only occurrence of a touch but not the position (coordinates) of the touch. When describing the structural elements of a typical portable device, the same reference numerals are applied to the same components as those of the portable device 10A. FIG. 5A is an equivalent circuit diagram showing a typical operation principle of a surface-capacitive type touch sensor device shown in FIG. 3, and it shows a case where the reference potential node 16 of the circuit is connected to an earth 35 via an AC socket. First, referring to FIG. 3, an AC voltage (amplitude Vin) is applied to the transparent conductive layer 39. According to a touch, the capacitance 25 is formed between the human body 4 including the finger 23 and the transparent conductive layer 39. Upon this, as shown in FIG. 5A, the capacitance 25 is connected to the earth 35 via the human body 4. This is due to the fact that the human body 4 exhibits a grounding effect. However, there is parasitic impedance between the human body 4 and the earth 35. The parasitic impedance is defined as impedance Zb.

When the capacitive impedance formed with the capacitance 25 is defined as Z as in the equivalent circuit of FIG. 5A, the reference potential node 16 of the circuit and the impedance Z are connected via the earth 35 and the impedance Zb, thereby forming a closed circuit. The impedance of this closed circuit is formed with the capacitive impedance Z generated due to the touch and the parasitic capacitive impedance Zb. The AC voltage Vin is applied to the synthesized impedance to generate a current (amplitude Io).

Figure 5B:
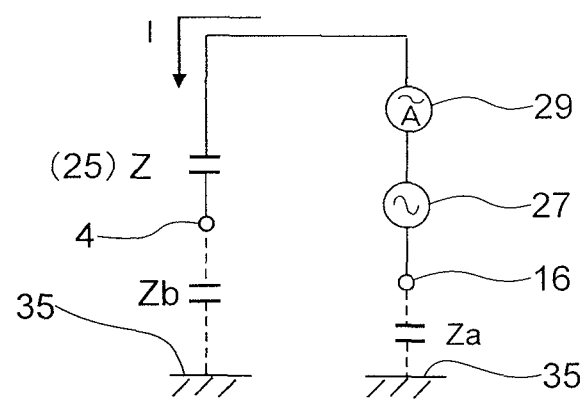
FIG. 5B is an equivalent circuit diagram showing an issue to be solved by the touch sensor device of the first exemplary embodiment.

FIG. 5B is an equivalent circuit diagram showing the issue to be solved by the first exemplary embodiment. In a typical portable device, power is supplied from the loaded battery 17. When charging the battery 17, the battery 17 is connected to the AC socket via a charger. When using the portable device by carrying it, the battery 17 is detached from the AC socket. Thus, the reference potential node 16 of the circuit is not connected to the earth 35 via the AC socket. As described, the typical portable devices have the battery 17 loaded thereon, so that there are cases where the reference potential node 16 of the circuit is not connected to the earth 35.

Then, as in the case of FIG. 5A, the impedance Z is formed due to a touch, and the impedance Z is connected to the earth 35. In the meantime, the reference potential node 16 of the circuit is not directly connected to the earth 35, so that the capacitive parasitic impedance Za formed with a floating capacitance and the like is formed between the reference potential node 16 and the earth 35. That is, the reference potential node 16 is grounded via the impedance Za. Note here that the synthesized impedance of the impedance Za and the impedance Zb is defined as impedance Zp. In a closed circuit of FIG. 5B, the impedance Z and the impedance Zp are in a series relation, and the synthesized impedance thereof is (Z+Zp). Thus, the current (amplitude I) flown in the closed circuit shown in FIG. 5B is I=Vin/(Z+Zp). There is also parasitic impedance between the human body 4 and the reference potential node 16. However, the component of the parasitic impedance is considered to be contained in the impedance Za and the impedance Zb by the equivalent circuit.

Figure 6:
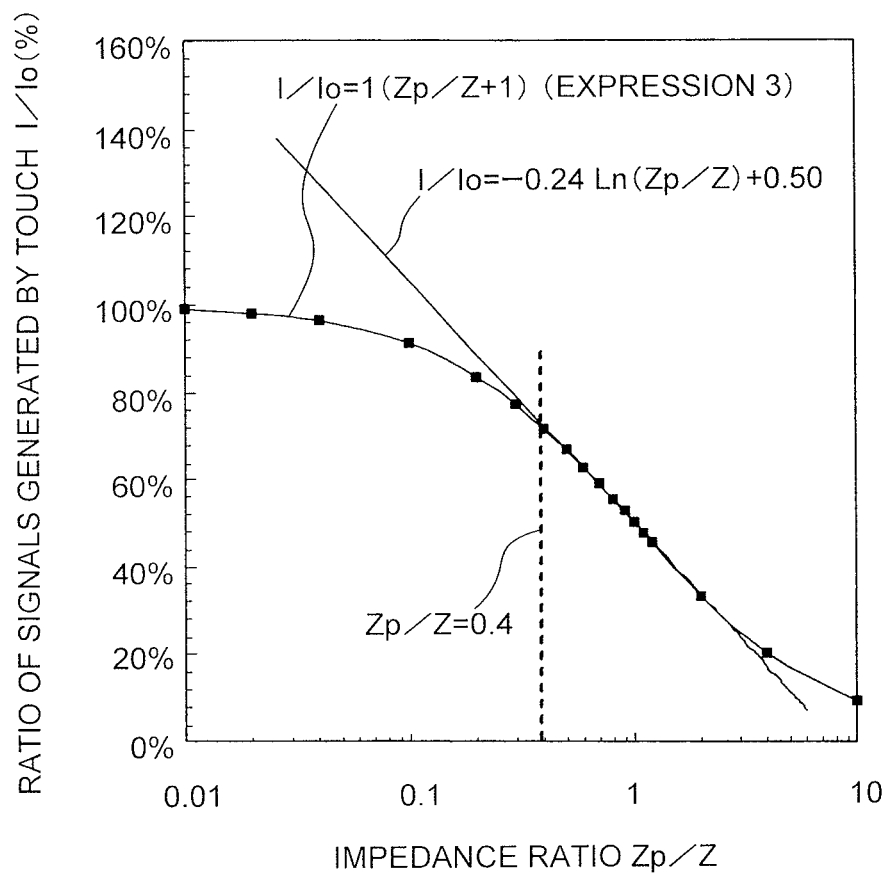
FIG. 6 is a graph showing calculation results regarding influences of parasitic impedance imposed upon currents generated by a touch.

FIG. 6 is a graph showing a calculated relation between the impedance of the closed circuit and the current. A derived formula is as follows.

$$I/Io = 1/(Zp/Z + 1) \quad \text{(Expression 3)}$$

The horizontal axis of FIG. 6 is a ratio (Zp/Z) of the impedance Zp and the impedance Z. The longitudinal axis is the signal generated by the touch. That is, the ratio I/Io of the current I shown in FIG. 5B and the current Io shown in FIG. 5A is illustrated in percentages. Note here that frequency f of the AC voltage is set as 100 kHz. When the impedance Zp is increased to such an extent that cannot be ignored compared to that of the impedance Z, the current I is influenced and decreased. Thus, I/Io becomes decreased as shown in the graph.

The current generated due to the touch corresponds to the signal components of the touch sensor function, so that the S/N of the touch sensor function is deteriorated when the current generated due to the touch decreases. Accordingly, the sensitivity of the touch sensor function is degraded. Similarly, the positioning accuracy when detecting the touched position is degraded. That is, as shown in FIG. 6, when the parasitic impedance Zp becomes increased, the sensitivity and the positioning accuracy are degraded. Further, the impedance Zp changes also depending on the conductivity of the casing that covers the circuit. When there is a change in the surrounding environments of the circuit, the impedance Zp changes. Furthermore, the surrounding environments continuously change because the portable device is carried and moved, so that he impedance Zp changes. As described, the impedance Zp changes depending on the surrounding environments and the use condition, so that the sensitivity and the positioning accuracy of the touch sensor function become unstable.

Figure 7A:
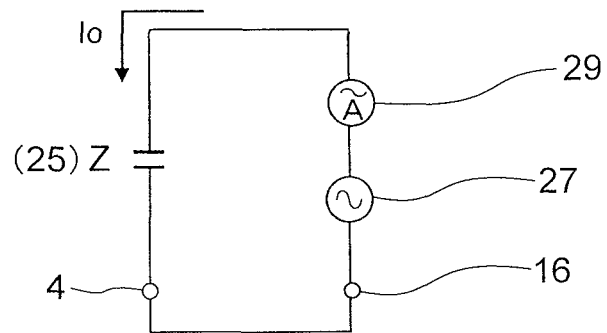
FIG. 7A is an equivalent circuit diagram showing an operation principle of a surface-capacitive type touch sensor device.

FIG. 7A is an equivalent circuit diagram showing an operation principle of the first exemplary embodiment. It is a surface type, and has the battery 17 loaded thereon for mobile use. The reference potential node 16 of the circuit is floated with respect to the earth. As in the cases of FIG. 5A and FIG. 5B, the capacitance 25 is formed due to the touch, and one end of the capacitance 25 is connected to the human body 4. In the first exemplary embodiment, unlike the case of FIG. 5B, for the other end of the capacitance 25, the circuit reference potential node 16 floated with respect to the earth is connected to the human body 4 with low impedance. Since the human body 4 is conductive, the floated circuit reference potential node 16 becomes also the potential of the human body 4 when the circuit reference potential node 16 of FIG. 7A is connected to the human body 4.

In this manner, the impedance Zp is decreased, so that the impedance of the closed circuit is decreased. In FIG. 7A, the impedance Zp is considered almost 0, and is not illustrated in the drawing. The impedance Zp of FIG. 7A is sufficiently small with respect to the impedance Z, so that it can be ignored. Thus, in FIG. 6, Zp/(Zp+Z) which is the horizontal axis of the graph becomes almost 0. And this time, in FIG. 6, it is found that that the current change amount is not decreased. Therefore, it is possible to suppress decrease in the changes in the current generated due to the touch, which is flown in the closed circuit employed for the surface type mobile use.

In order to verify the effects of the first exemplary embodiment, the currents generated by the touch were measured with each of the structures shown in (a)-(c) in the followings. (a) is a case where the reference potential wiring 15 of the circuit is connected to the earth 35 via the AC socket (FIG. 5A). (b) is a case of a battery-driven type, in which the reference potential node 16 of the circuit is floated (FIG. 5B). (c) is a case of a battery-driven type, in which the reference potential node 16 of the circuit is connected to the human body 4 (FIG. 7A).

Further, the output of the current-voltage converting circuit was measured by setting the amplitude of the AC voltage supply 27 as 1V and the frequency as 100 kHz. In this measurement, a multi-meter having a built-in battery was used as a measuring device so as not to be influenced by the earth of the measuring system. The result obtained by calculating the currents generated due to the touches based on the measurement result of the output is shown in FIG. 7B.

Figure 7B:
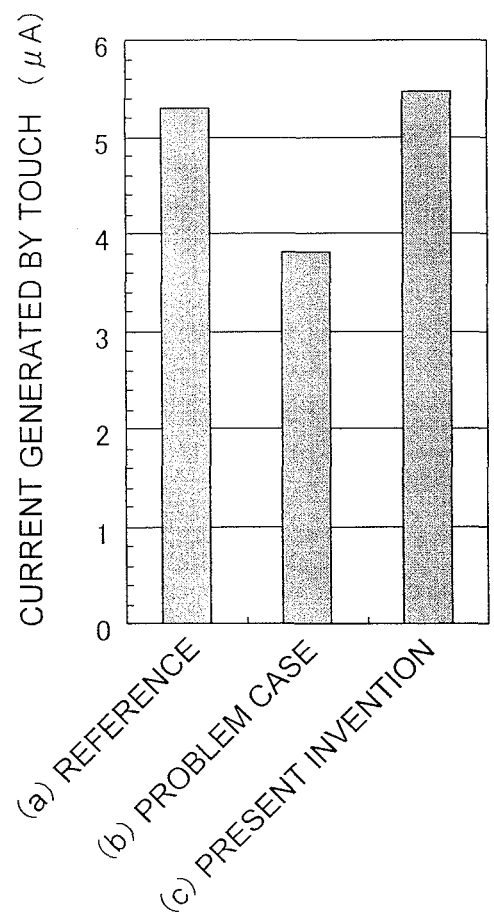
FIG. 7B is a graph showing measurement results of currents generated in accordance with the touch in the touch sensor device of the first exemplary embodiment.

As can be seen from FIG. 7B, there are notable difference observed as in (a) 5.3 μA, (b) 3.8 μA, and (c) 5.5 μA. Provided that the current value of (a) is reference Io, and the current values of (b) and (c) are I, there is a notable decrease with (b) as in I/Io=72%. This corresponds to the issue to be solved by the present invention. In the meantime, with (c) of the present invention, it is almost 100% as in I/Io=103%. Thus, it has been verified that the decrease in the currents generated due to the touch can be suppressed by connecting the reference potential node 16 of the circuit to the human body 4 even in a case of battery-driven type.

In a curve (Expression 3) of FIG. 6, when Zp/Z is sufficiently small, the decrease in I/Io with respect to the increase in Zp/Z is moderate. However, when Zp/Z becomes larger than 0.4, I/Io drastically decreases along a straight line I/Io=−0.24·Ln(Zp/Z)+0.5 shown in the graph. Thus, in order to suppress the decrease in I/Io, it is preferable for Zp/Z to be 0.4 or smaller. Zp was calculated in a following manner. When necessary capacitance for detecting occurrence of touch is 3 pF and capacitance C generated by the touch is 3 pF, there is obtained Z=531 kΩ from Z=1/w/C. Note here that w (=2πf) is an angular frequency. By substituting Z=531 kΩ to Zp/Z≤0.4, Zp≤212 kΩ can be obtained.

With the structure of (c), the conductive wrist strap 11 is attached to a part of the human body 4 as shown in the use example of the portable device 10A in FIG. 1, and the plug 12 of the cable 9 of the wrist strap 11 is inserted to the jack 13 of the casing 3 of the portable device 10A. The jack 13 is connected to the reference potential node 16 of the circuit inside the casing 3. In this manner, the reference potential node 16 of the circuit is connected to the human body 4 by using a tool such as the wrist strap 11.

With the first exemplary embodiment, decrease in the signals generated due to the touch can be suppressed under a mobile environment through electrically connecting the reference potential node 16 of the circuit with the human body 4. Therefore, it is possible to provide the touch sensor device 1A which is excellent in the sensitivity and the positioning accuracy of the touch sensor function even under the mobile environment. The reason thereof is that the floated circuit reference potential node 16 can be made as the potential of the human body 4, since the human body 4 is conductive. Particularly, with the first exemplary embodiment, the operations of the touch sensor device 1A can be stabilized further since secure conduction between the reference potential wiring 15 and the human body 4 can be obtained through connecting the human body 4 with the reference potential wiring 15 via the cable 9 and the wrist strap 11.

The second effect is that it is possible to have an economical structure that requires no special tool such as the wrist strap 11 used for connecting the reference potential node 16 of the circuit with the human body 4 by using an earphone or a headphone. The reason thereof is that the earphone and the headphone are capable of providing their primal effect which is to convert the electric signals outputted from the portable device 10A to sound waves near the ear, and also capable of connecting the reference potential wiring 15 of the circuit with the ear or a part of the human body 4 near the ear by also placing the reference potential wiring 15 inside the cable 9.

As an exemplary advantage according to the invention, the present invention is capable of increasing the detection currents and suppressing noises and influences of surrounding environments, since no parasitic impedance is contained in a closed loop where the detection currents flow. Therefore, it is possible to improve the position detecting accuracy by detecting currents.

(Second Exemplary Embodiment)

Figure 9:
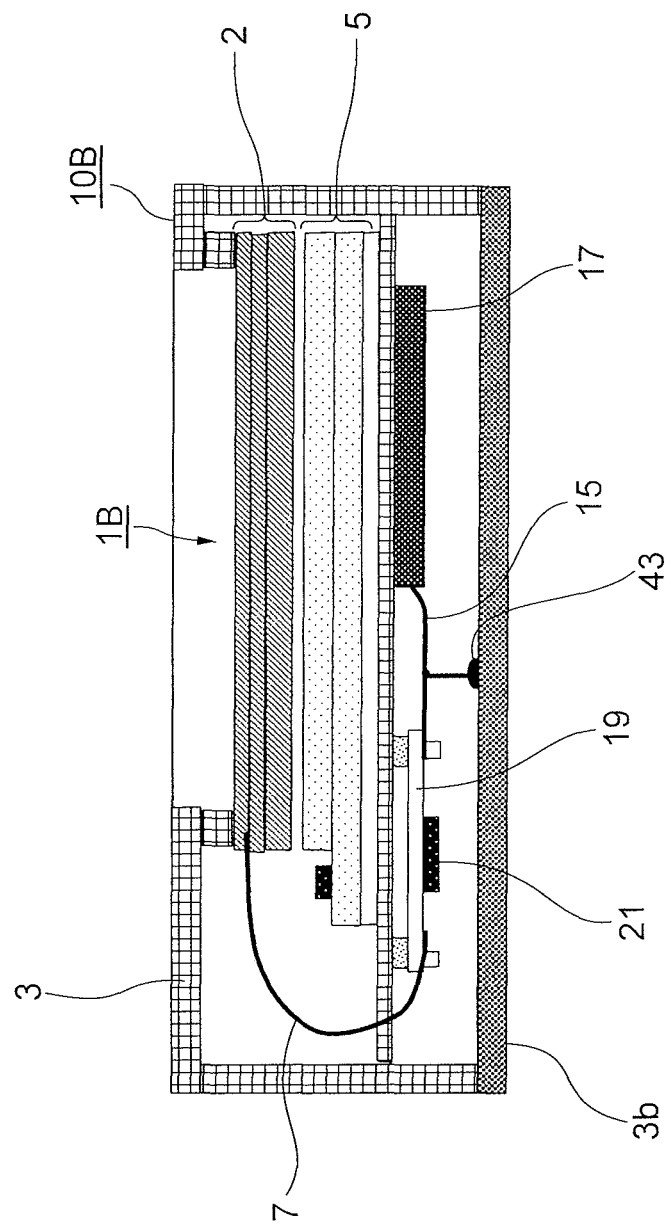
FIG. 9 is a cross-sectional schematic view of the portable device shown in FIG. 8.

Next, a second exemplary embodiment of the present invention will be described by referring to FIG. 8 and FIG. 9. Hereinafter, same reference numerals as those of the first exemplary embodiment are used for substantially the same structural elements as those of the first exemplary embodiment, and only different points from those of the first exemplary embodiment will be described. FIG. 8 is a perspective view showing a portable device to which a touch sensor device according to the second exemplary embodiment is loaded. FIG. 9 is a cross-sectional schematic view of the portable device shown in FIG. 8.

A touch sensor device 1B of the second exemplary embodiment is mounted into a portable device 10B. A second human body contact part is a conductor (3b) which forms the surface of a casing 3 of the portable device 10B. The conductor (3b) is achieved by a conducting part 3b of the casing 3.

In the first exemplary embodiment (FIG. 1 and FIG. 2) described above, the reference potential wiring 15 of the circuit is substantially extracted out of the portable device 10A by connecting the reference potential wiring 15 of the circuit with a tool such as the wrist strap 11. Meanwhile, the tool such as the wrist strap 11 is not used in the second exemplary embodiment. That is, the conducting part 3b is formed by using a conductive material such as stainless steel or aluminum alloy for at least a part of the casing 3, and the conducting part 3b of the casing 3 is connected to the reference potential wiring 15 of the circuit of the touch sensor device 1B. The conducting part 3b is provided on the back face side of the portable device 10A. Here, the conductive core of the reference potential wiring 15 of the circuit is exposed from a covered protective layer, and connected to the conducting part 3b of the casing 3 via a solder part 43. In this manner, in a part (the conducting part 3b) of the casing 3, the part from the inner side to the outer side becomes the reference potential node 16 of the circuit.

In the meantime, for the portable device 10B such as a PDA to which the touch sensor device 1B is loaded, it is typical for an operator to touch a touch panel 2 with a finger 23, and to support the portable device 10B with a palm or the like of the other hand. As in this case, a part of the human body 4 makes a contact with a part (conducting part 3b) on the outer side of the casing 3, when the casing 3 is supported by the hand. With the second exemplary embodiment, a part of the casing 3 is formed as the conducting part 3b, and the conducting part 3b is electrically connected to the reference potential wiring 15 of the circuit. Thereby, a part of the human body 4 is connected to the reference potential node 16 of the circuit, so that the floated circuit reference potential node 16 can be made as the potential of the human body 4. Other structures, operations, and effects are the same as those of the first exemplary embodiment.

(Third Exemplary Embodiment)

Figure 10A:
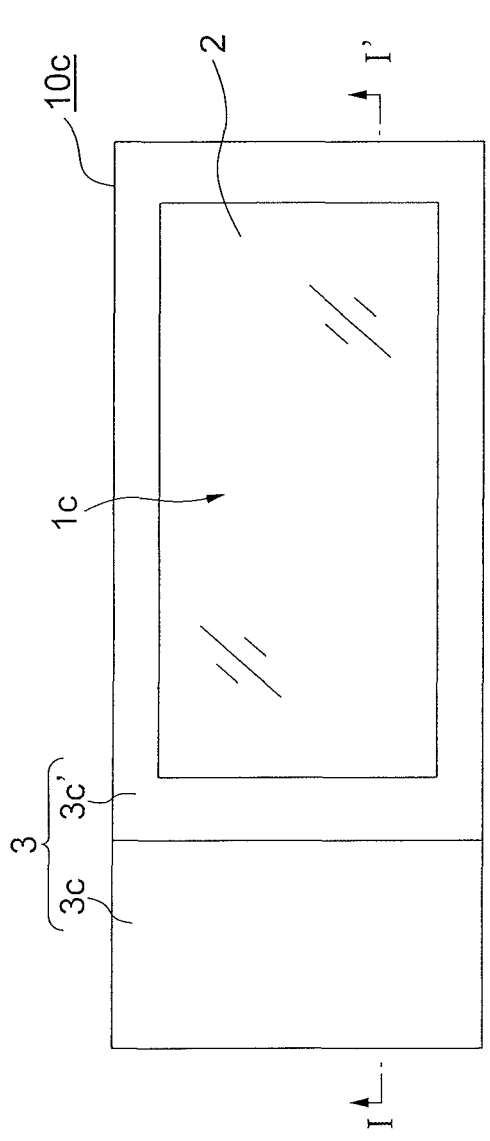
FIG. 10A is a plan schematic view showing a portable device to which a touch sensor device according to a third exemplary embodiment is loaded.
Figure 10B:
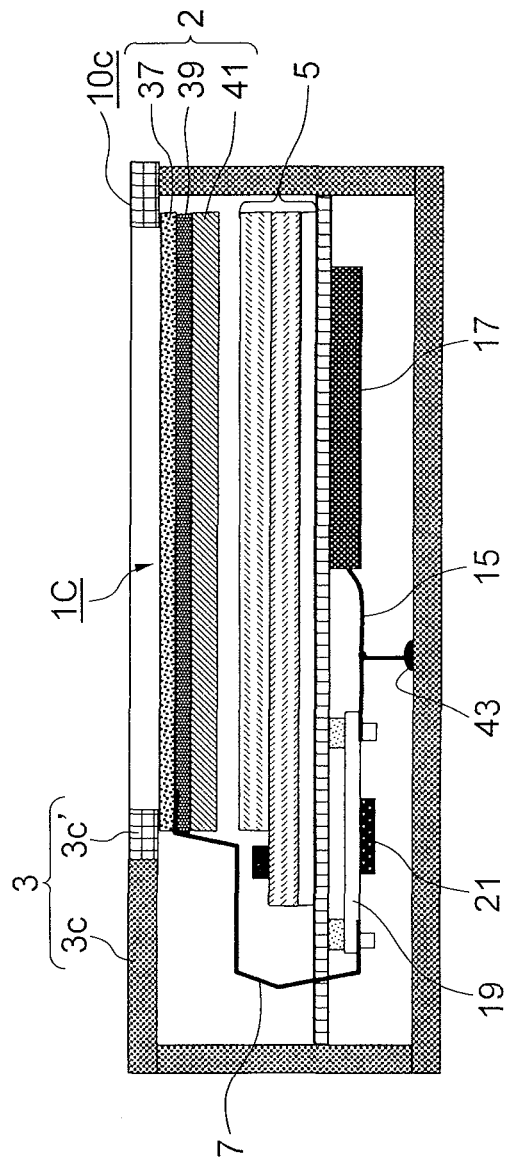
FIG. 10B is a cross-sectional schematic view taken along a line I-I' of FIG. 10A.

Next, a third exemplary embodiment of the present invention will be described by referring to FIG. 10. Hereinafter, same reference numerals as those of the second exemplary embodiment are used for substantially the same structural elements as those of the second exemplary embodiment, and only different points from those of the first exemplary embodiment will be described. FIG. 10A is a plan schematic view showing a portable device to which a touch sensor device according to the third exemplary embodiment is loaded, and FIG. 10B is a cross-sectional schematic view taken along a line I-I' of FIG. 10A.

A touch sensor device 1C of the third exemplary embodiment is mounted into a portable device 10C. A second human body contact part is a conductor (3c) which forms the surface of a casing 3 of the portable device 10C. The conductor (3c) forms the entire surface of the casing 3 except the periphery of a first human body contact part (2) of the touch panel. The conductor (3c) is achieved by a conducting part 3c of the casing 3.

In the second exemplary embodiment (FIG. 8 and FIG. 9) described above, only a part (back face) of the casing 3 is formed as the conducting part 3b. Meanwhile, in the third exemplary embodiment, almost the entire casing 3 is formed as the conducting part 3c, and only a part of the casing 3 in the periphery of the touch panel 2 is formed as an insulating part 3c'. A protective layer 37 of the touch panel 2 is of an insulating property. However, referring to FIG. 10B, the outer periphery of the protective layer 37 and a part of the casing 3 overlap with each other two-dimensionally, and the casing 3 and the protective layer 37 are glued to each other at the overlapping part. In this manner, the touch panel 2 is supported by the casing 3.

It is supposed here that this part (part glued with the protective layer 37) of the casing 3 is conductive, and is in the potential of the reference potential node 16 of the circuit. With that, an AC current flows in the conductive casing 3 via the capacitive impedance of the protective layer 37 according to a potential difference between the transparent conductive layer 39 and the conductive casing 3, since an AC voltage is applied to the transparent conductive layer 39. This AC current becomes a noise signal for the signal generated due to a touch, so that S/N of the touch sensor function is degraded. In other words, the parasitic capacitance from the view of the transparent conductive layer 39 is increased. As described, when the casing in the peripheral part of the touch panel 2 is made conductive, that part becomes the potential of the reference potential node 16, thereby causing another issue.

Thus, when almost the entire casing 3 is formed as the conducting part 3c, the casing 3 in the periphery of the touch panel 2 is formed as the insulating part 3c'. This makes it possible to reduce such noise signal. Specifically, the casing 3 (3c, 3c') which is integrally formed with a resin and stainless steel is used. A thin plate type stainless steel is placed into a mold, and a resin is poured into the casing part in the periphery of the touch panel 2 to form the casing 3 (3c, 3c').

Further, the longer the distance of the insulating part 3c' (i.e., distance from the transparent conductive layer 39 to the conducting part 3c) is, the smaller the noise signal becomes. The reason is that the capacitance is in inverse proportional to the distance of the insulator. In the meantime, the capacitance generated due to the touch becomes larger as the thickness of the protective layer 37 becomes thinner. Therefore, the longer the isolated distance from the touch panel 2 set for the conducting part 3c kept to the reference potential node 16 of the circuit and the thinner the protective layer 37, the higher the S/N of the touch sensor function can become. Specifically, the distance of the insulating part 3c' is preferable to be ten times or more with respect to the thickness of the protective layer 37, 0.1-1 mm.

Further, the insulating part 3c' of the casing 3 is preferable to be water-repellent. Here, water drops can be scattered by being repelled slightly, even when water falls on the insulating part 3c'. Particularly, when the contact angle between the insulating part 3c' and the water drop is 100 degrees or more, the water drop keeps a ball-shape as if it is standing on the insulating part 3c'. Specifically, a silicon resin or the like is used as the material for the insulating part 3c'.

There may be cases where water happens to fall over the casing 3, when the portable device 10C is being used. Water normally contains ionic impurity and is conductive. Thus, even if the casing 3 in the periphery of the touch panel 2 is formed as of insulating property, there is a same issue generated as the case where the casing in the periphery of the touch panels 2 is formed as conductive once water is attached thereto. Therefore, the parasitic capacitance can be decreased by forming the insulating part 3c ' to be water-repellent so as to repel the water not to be remained on the surface thereof.

Further, the insulating part 3c' of the casing 3 may be formed to be dustproof Specifically, coating of oil or acryl-based material or the like is applied. There may be cases where dusts happen to fall over the casing 3, when the portable device 10C is being used. Dusts may contain conductive materials. Thus, there is a same issue generated as the case where the casing in the periphery of the touch panels 2 is formed as conductive once dusts are attached thereto. Therefore, there is such an effect that the parasitic capacitance can be decreased by forming the insulating part 3c' to be dustproof so as to repel the dusts not to be remained on the surface thereof, even when dusts fall over the casing 3. Therefore, there provides an effect of decreasing the noise signal with the third exemplary embodiment by making the conducting part 3c of the casing 3 to be in the potential of the reference potential node 16. Other structures, operations, and effects are the same as those of the second exemplary embodiment.

(Fourth Exemplary Embodiment)

Next, a fourth exemplary embodiment of the present invention will be described by referring to FIG. 11. Hereinafter, same reference numerals as those of the third exemplary embodiment are used for substantially the same structural elements as those of the third exemplary embodiment, and only different points from those of the third exemplary embodiment will be described. FIG. 11A is a plan schematic view (back face side) showing a portable device to which a touch sensor device according to the fourth exemplary embodiment is loaded. FIG. 11B is a cross-sectional schematic view taken along a line II-II' of FIG. 11A.

A touch sensor device 1D of the fourth exemplary embodiment is mounted into a portable device 10D. A second human body contact part is a conductor (45) which forms the surface of a casing 3 of the portable device 10D. The conductor (45) is a conductive film (45) provided on the surface of the casing 3. The conductive film (45) is achieved by a conductive adhesive label 45. In the fourth exemplary embodiment, the adhesive label 45 is provided only on the back face of the portable device 10D.

In the third exemplary embodiment (FIG. 10) described above, an insulating material such as a resin is used for the part of the casing 3 of the portable device 10D in the surrounding of the touch panel 2, and a conductive material such as stainless steel or aluminum alloy is used for other parts. Then, the reference potential wiring 15 of the circuit and the conducting part 3c of the casing 3 are connected. In the meantime, in the fourth exemplary embodiment, the adhesive label 45 printed by a conductive ink or the like is formed on a part of the surface of the casing 3. As other methods for acquiring the adhesive label 45, there are coating, vapor deposition, and the like. As the material for the adhesive label 45, a conductive resin or the like is used. As a conductive resin additive (filler), silver, carbon, or graphite is used. For a resin material, polyester or acryl is used.

With the fourth exemplary embodiment, the material of the casing 3 may not have to be conductive. Only a necessary part of the casing 3 may simply be formed as conductive. The portable device 10D is supported by a part of human body such as a hand, so that only a part of the casing 3 to be in contact may be formed as conductive. Then, a through hole 47 is formed in the casing 3, and a through-hole electrode is formed therein with a conductive resin. Thereby, the adhesive label 45 of the casing 3 and the reference potential wiring 15 of the circuit are connected.

As another method, there is a method which utilizes a lid (not shown) which is normally provided to the casing 3 for exchanging the battery 17. With this method, the surface, back face, and side faces of the lid are formed all conductive, so that the surface and the back face of the lid are electrically connected. Therefore, the reference potential wiring 15 of the circuit and the back face of the lid are connected, and the surface of the lid and the human body may be connected.

Compared to the conductive materials such as stainless steel and aluminum alloy, the insulating material such as a resin is low in the manufacturing cost. As a result, in addition to the effects of the third exemplary embodiment, there is no restriction set in the material itself of the casing 3 with the fourth exemplary embodiment. Moreover, the second human body contact part (45) can be manufactured at a low cost. Other structures, operations, and effects are the same as those of the third exemplary embodiment.

(Fifth Exemplary Embodiment)

Next, a fifth exemplary embodiment of the present invention will be described by referring to FIG. 28. Hereinafter, same reference numerals as those of the second exemplary embodiment are used for substantially the same structural elements as those of the second exemplary embodiment, and only different points from those of the second exemplary embodiment will be described. FIG. 28 is a perspective view showing a portable device to which a touch sensor device according to the fifth exemplary embodiment is loaded.

A touching sensor device 1N of the fifth exemplary embodiment is mounted into a portable device 10N, and it further includes a pen 70 as an indicator. The pen 70 includes a point section 72 which approaches to the transparent conductive layer 39 as the impedance face, and a grip section 74 which is grasped by the hand of the human body 4. The point section 72 and the grip section 74 are both conductive, and are connected electrically. The point section 72 is preferable to have elasticity of about the same degree of that of the finger tip of the human body 4. With the fifth exemplary embodiment, when the point section 72 makes contact with the insulating protective layer 37 (FIG. 3 or the like) which covers the transparent conductive layer 39, i.e., on the surface of the touch panel 2, the point section 72 approaches to the transparent conductive layer 39.

The surface-type touch sensor system is operated by a finger tip that is a part of the human body 4, so that it cannot be operated by an indicator called a stylus such as a pen (a conventional-type pen is not shown). When it can only be operated by a part of the human body such as a finger tip, there are following issues. When the finger tip touches the surface of the touch panel 2, the fingerprint of the finger or smudge such as grease may be attached thereon. Thus, the screen becomes hard to be seen. Further, there are issues of sanitation, e.g., such smudge gives a sense of uncomfortable feeling to the user. Furthermore, the grease attached to the surface is a floating capacitance from the touch panel 2 side, and the grease is attached to the surface of the touch panel 2 unevenly. Thus, the floating capacitances are distributed unevenly, so that the detecting accuracy may become deteriorated. In order to avoid such issues, it simply needs to be able to operate a pen. Hereinafter, the structure of the pen 70 according to the fifth exemplary embodiment will be described.

Figure 29A:
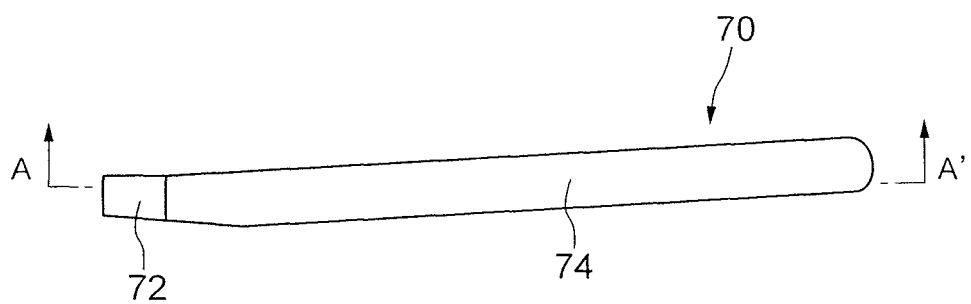
FIG. 29 shows a plan view of a pen shown in FIG. 28 and a longitudinal sectional view thereof taken along a line A-A'.
Figure 29B:
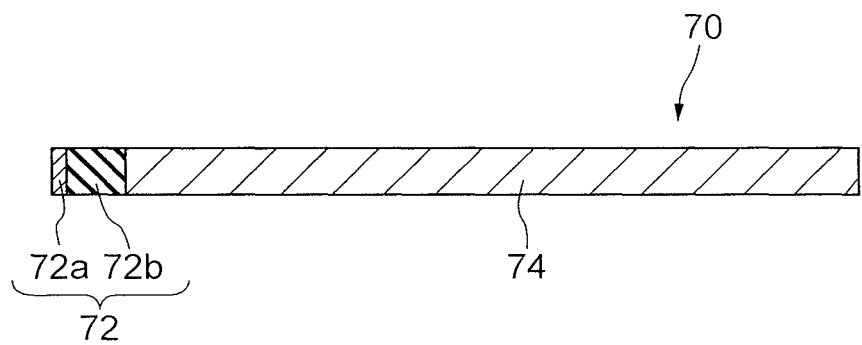

The point section 72 and the grip section (grip) 74 of the pen 70 are formed conductive, and the point section 72 and the grip section 74 are connected with low impedance. The structure of the pen 70 will be described by referring to FIG. 29. FIG. 29 shows a plane view of the pen 70 and a longitudinal sectional view taken along a line A-A'. In the point section 72, a conductor such as stainless or aluminum is used for a surface 72a thereof, and an elastic body such as urethane or silicone resin is used for a core 72b thereof. Further, it is also possible to use conductive sponge for the entire point section 72 without changing the materials for the surface 72a and the core 72b.

By forming the entire part of or the surface 72a of the point section 72 to be those that can form the equivalent capacitance as that of a finger, changes in the capacitances between the point section 72 and the position detecting transparent conductive layer 39 can be captured.

In the meantime, when there is unevenness on the contact surface of the point section 72, the actual contact area between the point section 72 and the surface of the touch panel 2 becomes small when the point section 72 touches the surface of the touch panel 2. Further, there may be a case where the surface of the touch panel 2 is tilted with respect to the pen 70. As the tilt between the surface 72a of the point section 72 and the surface of the panel 2 becomes larger when the point section 72 touches the surface of the touch panel 2, the actual contact area becomes smaller.

In the meantime, when the core 72b is formed as the elastic body equivalent to the finger tip, there is a repelling force applied to the point section 72 when the point section 72 touches the surface of the touch panel 2. Thus, the point section 72 changes its shape in accordance with the surface of the touch panel 2. In this manner, the contact area between the point section 2 and the surface of the touch panel 2 becomes larger, so that the changes in the capacitance can be captured fully.

Further, by grabbing the grip section 74 with the hand that operates the pen 70, the point section 72 and the human body 4 can be connected via the grip 74.

Furthermore, as in the case of the second exemplary embodiment, a part of the casing 3 of the portable device 10N is formed as a conducting part 3b, and the conducting part 3b is connected to the reference potential node of a detecting circuit with low impedance. When touching the conducting part 3b with the hand or the like when the user supports the portable device 10N, the reference potential node and the human body 4 can be connected with low impedance. Therefore, the reference potential node and the surface of the touch panel 2 can be connected with low impedance via the human body 4 and the pen 70. In this manner, it is possible to have a sufficient current flown in a closed circuit including the contact part without connecting the reference potential node to the earth via a socket or the like.

In the manner described above, pen operations can be done with the same principle as the case of pressing the surface of the touch panel 2 with a finger tip. With the fifth exemplary embodiment, not only the finger-tip operations but also pen operations can be done. Thus, finger tips are not to touch the touch panel 2, so that an issue of having the fingerprints and greases attached to the surface by the touch of the finger can be avoided. Other structures, operations, and effects are the same as those of the second exemplary embodiment. The fifth exemplary embodiment is so structured that the point section 72 approaches to the transparent conductive layer 39. However, it is also possible to employ a structure in which the point section 72 contacts with the transparent conductive layer 39 by not providing the protective layer 37 (FIG. 3 and the like).

(Sixth Exemplary Embodiment)

Figure 12:
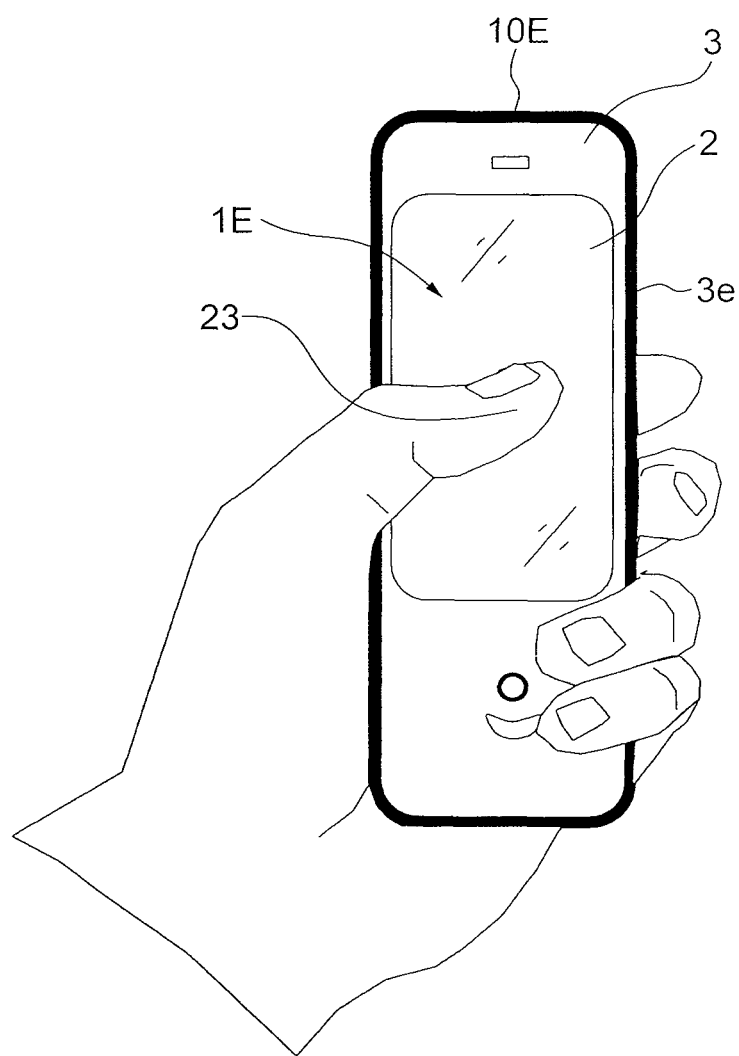
FIG. 12 is a perspective view showing a portable device to which a touch sensor device according to a sixth exemplary embodiment is loaded.

Next, a sixth exemplary embodiment of the present invention will be described by referring to FIG. 12. Hereinafter, same reference numerals as those of the fourth exemplary embodiment are used for substantially the same structural elements as those of the fourth exemplary embodiment, and only different points from those of the fourth exemplary embodiment will be described. FIG. 12 is a perspective view showing a portable device to which a touch sensor device according to the sixth exemplary embodiment is loaded.

A touch sensor device 1E of the sixth exemplary embodiment is mounted into a portable device 10E. A second human body contact part is a conductor (3e) which forms the surface of a casing 3 of the portable device 10E. The conductor (3e) is achieved by a conducting part 3e.

In the first-fourth exemplary embodiments (FIG. 8, for example) described above, assumed is a form in which one of the hands of the operator of the portable device 10B touches the touch panel 2, and the other hand supports the portable device 10B. In the meantime, with the sixth exemplary embodiment, the potable device 10E is supported and operated mainly with one hand. In the sixth exemplary embodiment, the conducting part 3e of the casing 3 connected to the reference potential node of the circuit is arranged to be touched by the hand that supports the portable device 10E. In FIG. 12, the back face of the portable device 10E comes to be in contact with the palm of the hand, so that the back face of the portable device 10E is formed as the conducting part 3e. As described, it is also possible to suppress decrease in the signals generated by the touch even in a case where the portable device 10E is supported and operated with one hand. Other structures, operations, and effects are the same as those of the fourth exemplary embodiment.

(Seventh Exemplary Embodiment)

Figure 13:
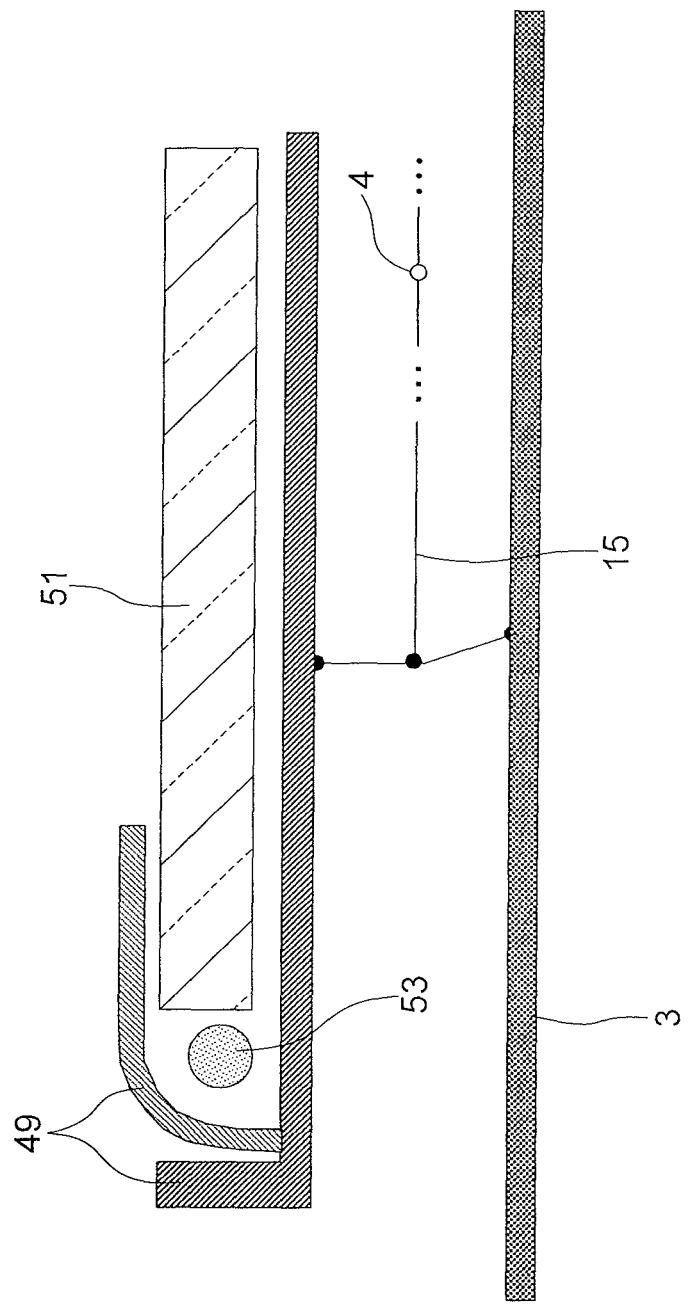
FIG. 13 is a perspective view showing a backlight part of a portable device to which a touch sensor device according to a seventh exemplary embodiment is loaded.

Next, a seventh exemplary embodiment of the present invention will be described by referring to FIG. 13. Hereinafter, same reference numerals as those of the second exemplary embodiment are used for substantially the same structural elements as those of the second exemplary embodiment, and only different points from those of the second exemplary embodiment will be described. FIG. 13 is a cross-sectional schematic view showing a part of a portable device to which a touch sensor device according to the seventh exemplary embodiment is loaded.

Referring to FIG. 9 showing the second exemplary embodiment and FIG. 13 showing the seventh exemplary embodiment, the portable device of the seventh exemplary embodiment includes: an LCD 5, backlights (51, 53) which generate light that transmits through the LCD 5; and a conductive folder 49 which reflects the light generated from the backlights (51, 53), and guides it to the LCD 5. A first human body contact part (2) is provided on the display face of the LCD 5. The folder 49 and a reference potential part (15) are electrically connected. The backlights (51, 53) are achieved by a light-guiding plate 51 and a light-emission source 53.

FIG. 13 only shows the backlight (51, 53) and the periphery thereof among the portable device of the seventh exemplary embodiment. In the seventh exemplary embodiment, a cold-cathode fluorescent lamp (CCFL) is used as the light-emission source 53 of the backlights. The light-emission source 53 and the voltage applying part thereof (not shown) are covered by the folder 49, and the folder 49 is conductive. A reflecting plate (not shown) and the light-guiding plate 51 are combined to that. The light-guiding plate 51 is formed by printing reflective dots on an acryl plate with white ink.

However, for the capacitive-type touch sensor device, a high-frequency electric field from the light-emission source 53 and the voltage applying part thereof becomes a noise source, which degrades the sensitivity for the occurrence of touch and the detecting accuracy of the touched position.

Thus, in the seventh exemplary embodiment, the folder 49 which covers the light-emission source 53 and the voltage applying part is also connected to the reference potential wiring 15. Then, by connected the reference potential wiring 15 with a part of the human body 4, the floated conductive folder 49 of the backlights is connected to the human body 4. As a result, the high-frequency electric field from the light-emission source 53 and the voltage applying part can be blocked. Therefore, it is possible to provide an effect of canceling the influence of the high-frequency electric field while suppressing decrease in the signals generated due to a touch. In this manner, the occurrence of touch and the touched position can be detected accurately. Other structures, operations, and effects are the same as those of the second exemplary embodiment.

(Eighth Exemplary Embodiment)

Figure 14:
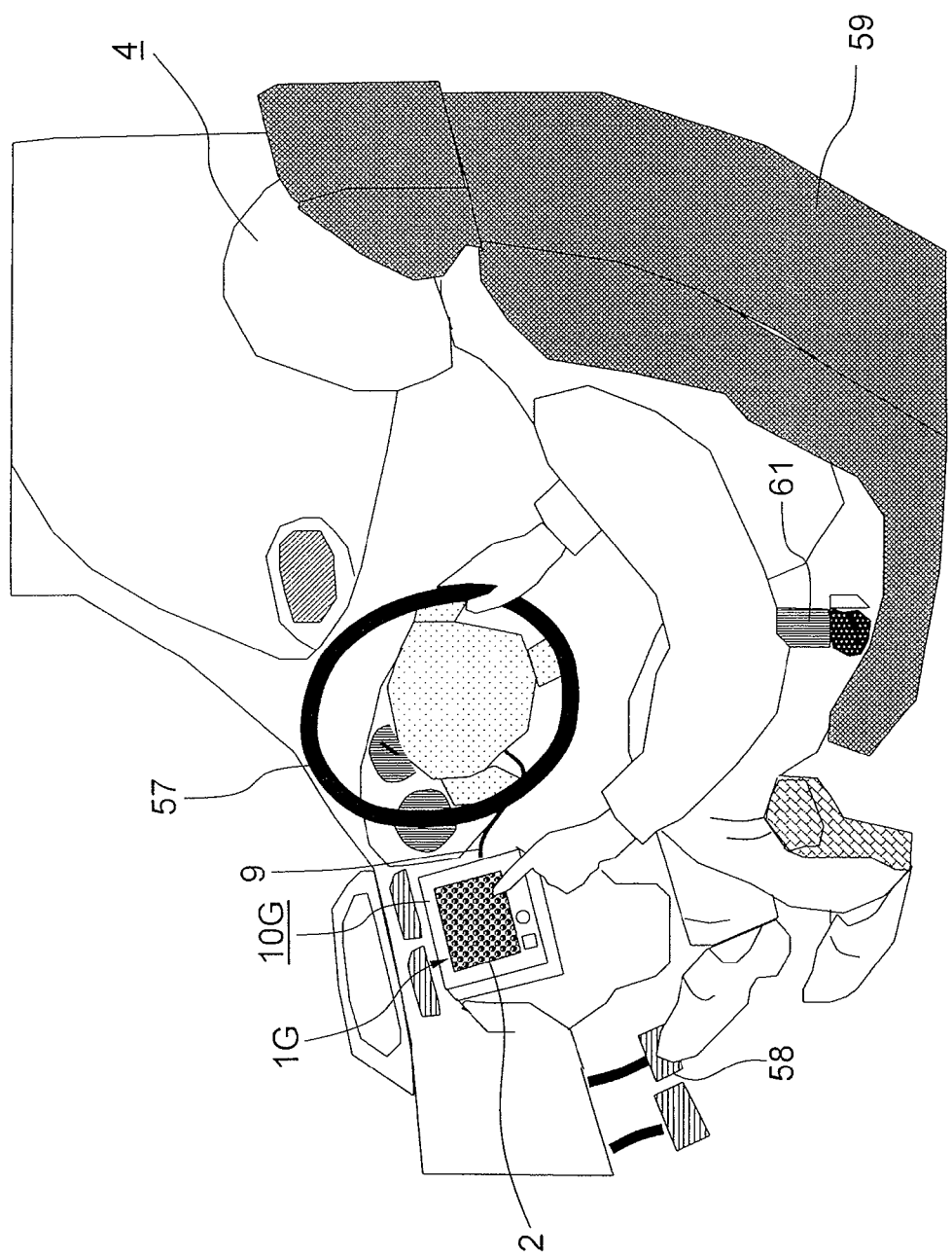
FIG. 14 is a perspective view showing an interior of an automobile and a car navigation system to which a touch sensor device according to an eighth exemplary embodiment is loaded.

Next, an eighth exemplary embodiment of the present invention will be described by referring to FIG. 14. Hereinafter, same reference numerals as those of the first exemplary embodiment are used for substantially the same structural elements as those of the first exemplary embodiment, and only different points from those of the first exemplary embodiment will be described. FIG. 14 is a perspective view showing an interior of an automobile and a car navigation system to which a touch sensor device according to the eighth exemplary embodiment is loaded.

A touch sensor device 1G of the eighth exemplary embodiment is mounted to an onboard device (10G). Second human body contact parts (9, 57, 58, 59, 61) include a conductive wire (9) connected to a reference potential part and conductors (57, 58, 59, 61) connected to the conducive wire (9). The conductors (57, 58, 59, 61) are provided to the parts where the human body 4 touches when in the car. In the eighth exemplary embodiment, the onboard device (10G) is achieved by a car navigation system 10G, the conducive wire (9) is achieved by a cable 9, the conductors (57, 58, 59, 61) are achieved by at least a part of a steering wheel 57, a pedal 58, a seat 59, and a seatbelt 61, respectively. Hereinafter, more detailed explanations will be provided.

The car navigation system 10G is an electronic device which can operate route setting and search under names of facilities while an automobile is being stopped. For security reasons, most of those devices are designed not to be operated while driving. The car navigation system 10G is placed on the front side within an automobile for the driver to check the route, and it is operated by the driver or a person seated in the passenger seat. As an input device of the car navigation system 10G, a touch sensor device 1G having a touch sensor function is used. In some car navigation systems, a keyboard loaded on the main body and a remote control function are used. However, that is inconvenient for the user, since it is necessary to check the screen display and the input device alternately when operating the system, for example. Further, the car navigation system 10G including a car audio system is driven by a battery loaded on the automobile.

Therefore, as described above, when a typical surface-capacitive type touch sensor device is used for the car navigation system 10G, the signal components generated due to a touch becomes decreased. Thus, the reference potential node 16 (FIG. 3) of the car navigation system 10G is connected to a part of the human body 4, so that the decrease in the signal generated due to the touch can be suppressed. At this time, it is preferable to connect the reference potential node with a part of the human body 4 by using a tool that is in contact with the onboard human body 4. Specifically, examples of such tools may be a conductive seatbelt 61, a steering wheel 57, a pedal 58, a seat 59, a foot mat, and the like. Those tools and the reference potential node of the car navigation system 10G are connected via the cable 9.

In this manner, it is possible to suppress decrease in the signals generated due to the touch even in an electronic device such as the car navigation system 10G which is battery-driven but the main body thereof is not supported by a hand. Other examples of the electronic device such as the car navigation system 10G which is battery-driven but the main body thereof is not supported by a hand are a desktop portable video reproducing device, television game machine attached to the seats of airplanes and buses, etc. Other structures, operations, and effects are the same as those of the first exemplary embodiment.

(Ninth Exemplary Embodiment)

Figure 15:
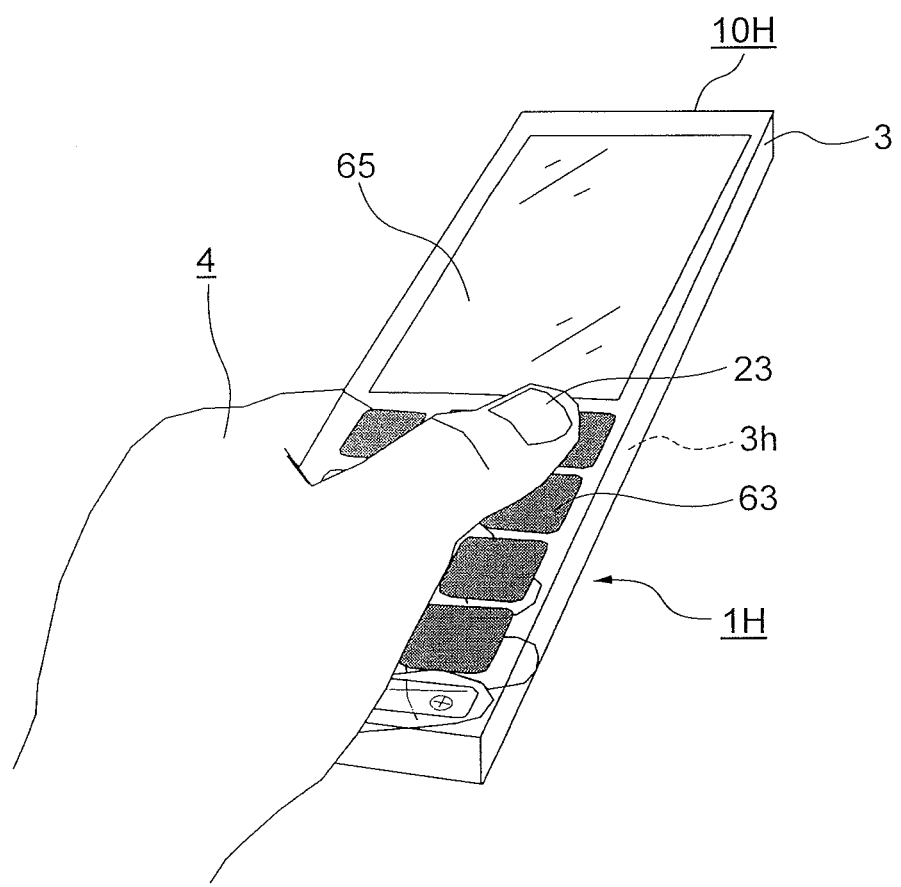
FIG. 15 is a perspective view showing a portable device to which a touch sensor device according to a ninth exemplary embodiment is loaded.
Figure 16A:
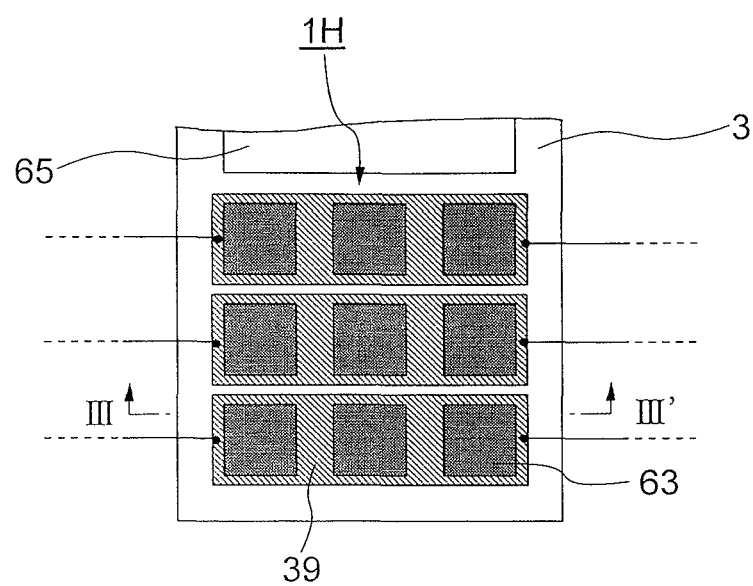
FIG. 16A is a plan schematic view showing a touch switch part of the portable device to which the touch sensor device according to the ninth exemplary embodiment is loaded.
Figure 16B:
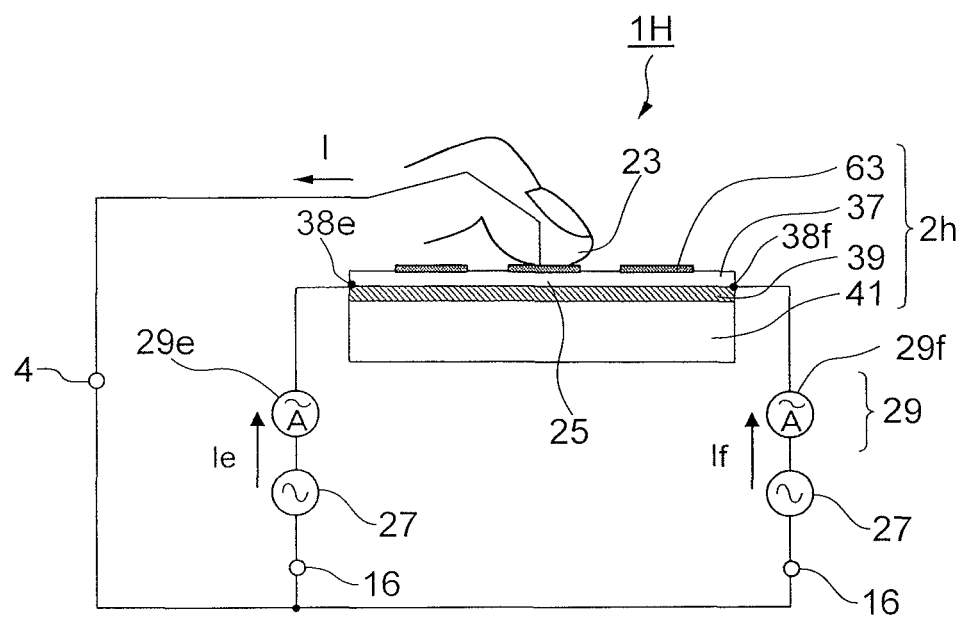
FIG. 16B is a cross-sectional schematic view taken along a line III-III' of FIG. 16A.

Next, a ninth exemplary embodiment of the present invention will be described by referring to FIG. 15 and FIG. 16. Hereinafter, same reference numerals as those of the second exemplary embodiment are used for substantially the same structural elements as those of the second exemplary embodiment, and only different points from those of the second exemplary embodiment will be described. FIG. 15 is a perspective view showing a portable device to which a touch sensor device according to the ninth exemplary embodiment is loaded. FIG. 16A is a plan schematic view of the portable device shown in FIG. 15, and FIG. 16B is a cross-sectional schematic view taken along a line III-III' of FIG. 16A.

A touch sensor device 1H of the ninth exemplary embodiment includes: a first human body contact part (2h) which forms a capacitance 25 between a human body 4 and itself when the human body 4 makes a contact or approaches thereto; a power supply part (27) which includes a battery that outputs a DC voltage, converts the DC voltage to an AC voltage, and outputs it from the first human body contact section (2h); a reference potential part (16) which becomes the reference potential of the AC voltage; a second human body contact part (3h) which is electrically connected to the reference potential part (16) and to which the human body 4 makes a contact; and a current detecting part (29) which detects electric currents flown from the power supply part (27) to the human body 4.

The first human body contact part (2h) includes: an impedance face (39) which is formed by a conductive film to which the human body 4 contacts or approaches; and a plurality of electrodes 38e, 38f, ... provided on the impedance face (39) and to which the AC voltage is applied. The current detecting part (29) includes a plurality of current detecting circuits 29e, 29d, ... which respectively detect the currents flowing in the plurality of electrodes 38e, 38f, ....

The touch sensor device 1H of the ninth exemplary embodiment is mounted into a portable device (10H). The second human body contact part (3h) is a conductor (3h) which forms the surface of a casing 3 of the portable device 10H. The first human body contact part (2h) is achieved by a touch switch 2h, the impedance face (39) is achieved by a transparent conductive layer 39, the power supply part (27) is achieved by an AC voltage supply 27, the reference potential part (16) is achieved by a reference potential node 16, the current detecting part 29 is achieved by a current detecting circuit 29, and the conductor (3h) is achieved by a conducting part 3h, respectively. The conducting part 3h is provided on the back face of the casing 3, for example. Hereinafter, more detailed explanations will be provided.

The portable device 10H includes a telephone function, an E-mail function, and the like. A plurality of keys 63 are arranged vertically and laterally on the lower side of a screen display part 65. Those keys 63 form a surface-capacitive type touch sensor device which is an input device for inputting alphabets, numbers, and the like. The touch switch 2h including each of the keys 63 detects only the occurrence of touches, and it is normally called a "capacitive switch". The capacitive switch operates by setting threshold values. Those threshold values are also used for judgments not only when the finger 23 is placed on the keys 63 but also when the finger 23 leaves the keys 63.

Referring to FIG. 16A, three laterally long transparent conductive layers 39 are arranged in the longitudinal direction, and three keys 63 are arranged laterally on each of the transparent conductive layer 39. Referring to FIG. 16B, the electrodes 38e, 38f are formed on the left and right edges of the transparent conductive layers 39, and the current detecting circuits 29e, 29f are connected in series to the electrodes 38e, 38f, respectively. The transparent conductive layers 39 are covered by a protective layer 37. In this manner, horizontal position detection, the so-called one-dimensional position detection, is carried out. Further, it is also possible to collectively arrange the plurality of keys 63 in the longitudinal direction.

Alternatively, each key 63 may be arranged individually without placing those in three-piece groups. For example, transparent conductive layers in a same size as that of the key 63 or one size larger are arranged vertically and laterally. An electrode is provided to each of the transparent conductive layers, and each electrode and the current detecting circuit is connected on one-to-one basis (not shown). It is also possible to cover the entire keys 63 by a single transparent conductive layer, and provide the electrodes at the four corners of the transparent conductive layer (not shown). In that case, the so-called two-dimensional position detection is carried out as in the case of other exemplary embodiments.

Power of the portable device 10H is supplied from a built-in battery, and the reference potential node 16 of the circuit is floated with respect to the earth. The reference potential nodes 16 of each current detecting circuit 29 together with the reference potential node 16 of the battery are connected to the human body 4 via the conducting part 3h of the casing 3 when the operator supports the portable device 10H. In this manner, the floated circuit reference potential node 16 becomes the potential of the human body 4, and the impedance from the reference potential node 16 of the circuit to the human body 4 can be decreased. Therefore, it is possible to suppress decrease in the signals generated due to a touch even in case of the touch sensor device 1H which detects only the occurrence of touches.

Further, as other usages of the touch sensor device 1H, there are call switches of elevators, front-panel display buttons of automobiles, security touch switches, automatic door touch switches, and input switches of amusement devices. For the call switches of elevators and the automatic door touch switches, the effects of the ninth exemplary embodiment can be achieved by placing a conductive sheet under the feet, and connecting it to the reference potential node 16 of the circuit of the touch sensor device 1H, for example. Other structures, operations, and effects are the same as those of the second exemplary embodiment.

(Tenth Exemplary Embodiment)

Figure 18:
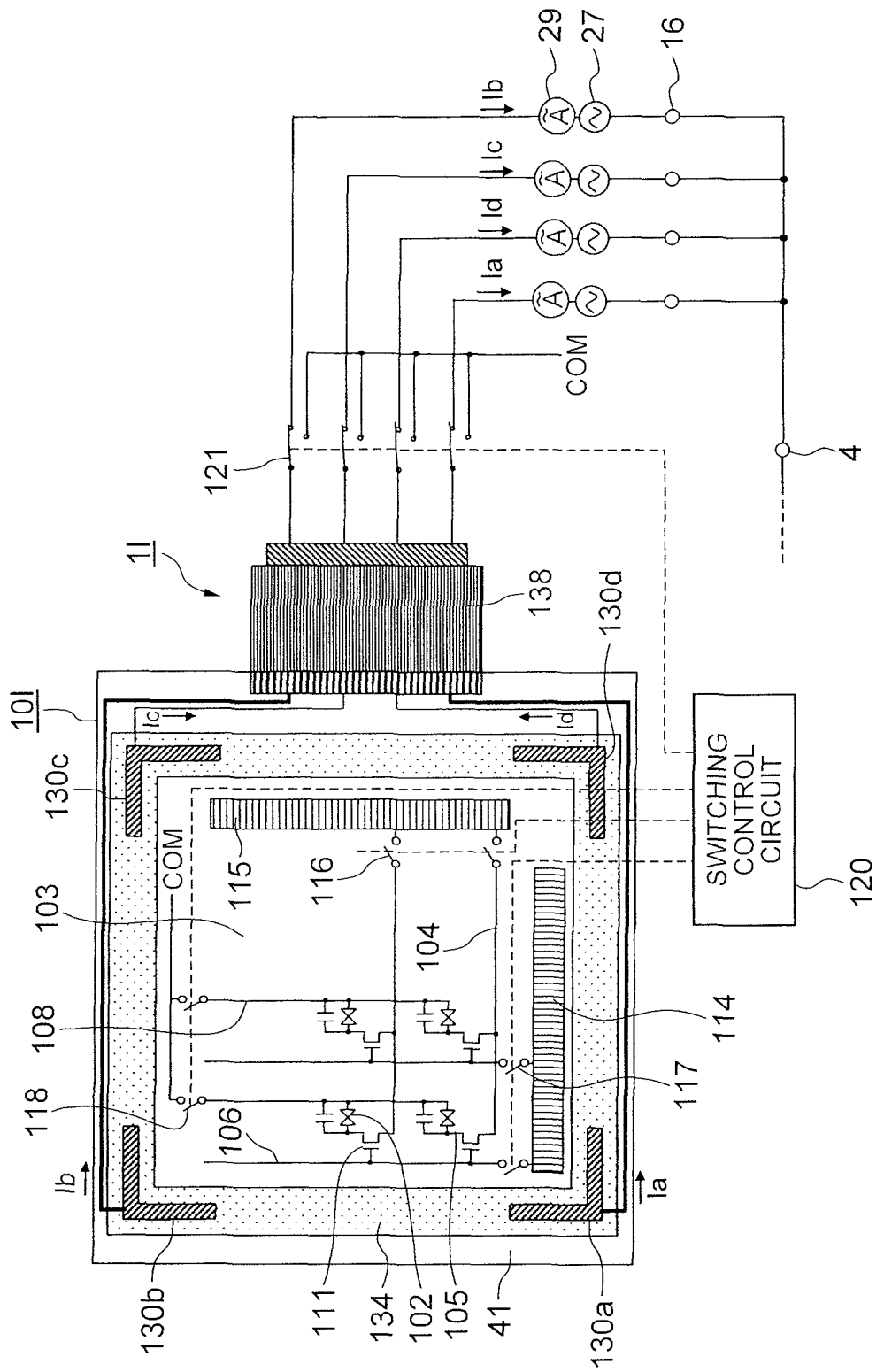
FIG. 18 is a plan schematic view of the LCD shown in FIG. 17.

Next, a tenth exemplary embodiment of the present invention will be described by referring to FIG. 17 and FIG. 18. Hereinafter, same reference numerals as those of the first exemplary embodiment are used for substantially the same structural elements as those of the first exemplary embodiment, and only different points from those of the first exemplary embodiment will be described. FIG. 17 is a perspective view showing an LCD having a touch sensor of the tenth exemplary embodiment built-in thereto. FIG. 18 is a plan schematic view of the LCD shown in FIG. 17. In FIG. 18, illustration of a counter substrate is omitted.

A touch sensor device 1I of the tenth exemplary embodiment is mounted into an LCD 10I that is a structure in which a liquid crystal (102) is sandwiched between a counter electrode 112 and a pixel electrode 105 as well as wirings (104, 106, 108). The counter electrode 112 is also used as the impedance face, and there are additionally provided switch parts (116, 117, 118, 121) which have at least a part of the wirings (104, 106, 108) electrically floated, or, apply an AC voltage applied to the impedance face at least to a part of the wirings (104, 106, 108) while having at least a part of the wirings (104, 106, 108) electrically floated.

In other words, the touch sensor device 1I of the tenth exemplary embodiment is mounted into the LCD 10I that is in a three-layer structure formed with the counter electrode 112, the liquid crystal (102), and the pixel electrode 105, and the counter electrode 112 is used also as the impedance face. Further, the switching parts (116, 117, 118, 121) which simultaneously apply the AC voltage to be applied to the impedance face also to a storage capacitance line 108 or have a scanning line 106 electrically floated are provided additionally.

In the first exemplary embodiment, the display device and the touch sensor device are fabricated as separate bodies. In the meantime, in the tenth exemplary embodiment, the LCD 10I is used for the display device, and the surface-capacitive type touch sensor device 1I is built-in thereto (FIG. 17). As will be described later, the transparent conductive layer used for the counter electrode 112 of the LCD 10I is utilized as the impedance face. In this manner, the manufacturing steps of the touch sensor device 1I can be simplified, and the manufacturing cost can be decreased. Further, since the substrate used exclusively for the touch sensor device 1I is unnecessary, the device can be formed light and thin. Further, there is achieved such an effect that the light transmittance becomes high, thereby making it possible to provide a fine picture quality in the display device.

However, the counter electrode 112 is close to a TFT substrate 110 via the liquid crystal element 102, so that there exists an extremely large capacitance such as the liquid crystal element 102. Thus, there is generated a potential difference between the counter electrode 112 and the TFT substrate 110 due to the potentials of the electrode and wirings (storage capacitance line 108, signal line 104, scanning line 106, and the like) on the TFT substrate 110. Therefore, the counter electrode functioning also as the impedance face is influenced by an extremely large parasitic capacitance. As a result, S/N of the touch sensor function becomes decreased, so that it becomes difficult to sense the occurrence of touch and to accurately detect the touched position.

Thus, as will be described later, in the tenth exemplary embodiment, the display period and the position detecting period are divided in terms of time. Then, in the position detecting period, a display region 103 is set to be in high impedance with respect to the outer side thereof so as to be electrically floated. Alternatively, in the position detecting period, the same voltage as that of the counter electrode 112 is applied to the electrodes and the wirings on the TFT substrate 110. As a result, the display region 103 is kept to the same potential as that of the counter electrode 112 due to capacitance-coupling between the display region 103 and the counter electrode 112. Thus, the potential of the display region 103 follows to be of the same potential as that of the counter electrode 112. Therefore, the influence of the parasitic capacitance for the counter electrode 112 can be suppressed to be extremely small.

Details of the tenth exemplary embodiment will be described by referring to FIG. 18. The tenth exemplary embodiment employs a structure in which switch devices are provided on the wirings for transmitting electric signals from the outside the display region to the inside the display region.

Specifically, the tenth exemplary embodiment includes a high-impedance switch part 116 (first high-impedance switch), a high-impedance switch part 117 (second high-impedance switch), and a high-impedance switch part 118 (third high-impedance switch) on a wiring part (will be described later) for transmitting electric signals from a second circuit unit (scanning line driving circuit 114, signal line driving circuit 115, and the like) on the outside the display region 103 to a first circuit unit (TFT 111, and the like) on the inside the display region 103.

Note here that the second circuit unit on the outside the display region 103 may be formed on the same substrate as that of the first circuit unit on the inside the display region 103 or may be formed on the outside substrate. In a case where the second circuit unit on the outside the display region 103 is formed on the same substrate as that of the first circuit unit on the inside the display region 103, it is preferable to provide the high-impedance switch parts 116, 117, and 118 on the wiring part which connects the outside the display region 103 and the outer substrate. Specifically, it is preferable for the wiring part where the high-impedance switch parts 116, 117, and 118 are provided to be at least one of the signal line 104, the scanning line 106, the storage capacitance line 108, and a power line (not shown).

Further, it is preferable to include a switching control circuit 120 for controlling the high-impedance switch parts 116, 117, and 118. The switching control circuit 120 is preferable to control at least one of the wirings in the wiring part for transmitting the electric signals from the outside the display region 103 to the inside the display region 103 to be in high impedance in the period when the current detecting circuit 29 detects the current.

Note here that an "impedance control unit" can be formed with the high-impedance switch parts 116, 117, 118 and the switching control circuit 120. This "impedance control unit" may be formed on the TFT substrate 110 or may be formed on a separate control circuit substrate.

This "impedance control unit" can make the first circuit unit inside the display region 103 of the TFT substrate 110 electrically high impedance with respect to the second circuit unit outside the display region during the detecting period where the contact position is detected. Further, the "impedance control unit" can include the high-impedance switch parts 116, 117, 118 formed on the wiring part which connects the first circuit unit and the second circuit unit, and the switching control circuit 120 for on/off controlling the high-impedance switch parts 116, 117, and 118.

Next, actions of the high-impedance switch parts 116, 117, and 118 will be described. The circumferential part of the display region 103 is in a following structure in order to generate an electrically high impedance state between the first circuit unit inside (inside the pixel matrix) of the display region 103 and the second circuit unit on the circumferential part of the display region 103. The high-impedance switch part 116 is provided to each signal path of the scanning line 106, the high-impedance switch part 117 is provided to each signal path of the signal line 104, and the high-impedance switch part 118 is provided to each signal path of the storage capacitance line 108. The high-impedance switches 116, 117, and 118 are switching-controlled by the switching control circuit 120. Thereby, the scanning line 106 and the signal line 104 for transmitting the electric signals from the outside the display region 103 to the inside can be made high impedance.

For the position detecting period, a vertical blanking period is utilized. In the position detecting period, the high-impedance switch parts 116, 117, and 118 are all in an off-state, as shown in FIG. 18. At this time, the signal line 104, the scanning line 106, and the storage capacitance line 108 are high impedance with respect to the wirings (scanning line driving circuit 114, signal line driving circuit 115, and wirings connected to a common electrode COM) on the outside the display region 103.

Further, in the position detecting period, a COM-current detecting circuit changeover switching part 121 becomes conductive to the AC voltage supply 27 side including the current detecting circuit 29. In the state of the switches shown in FIG. 18, an in-phase AC voltage generated by the AC voltage supply 27 is applied to electrodes 130a-130d provided in the vicinity of the four corners of the TFT substrate 110. The electrodes 130a-130d are electrically connected to the counter electrode 112 via an anisotropic conductor 134, so that the AC voltage is applied to the vicinity of the four corners of the counter electrode 112.

Figure 19:
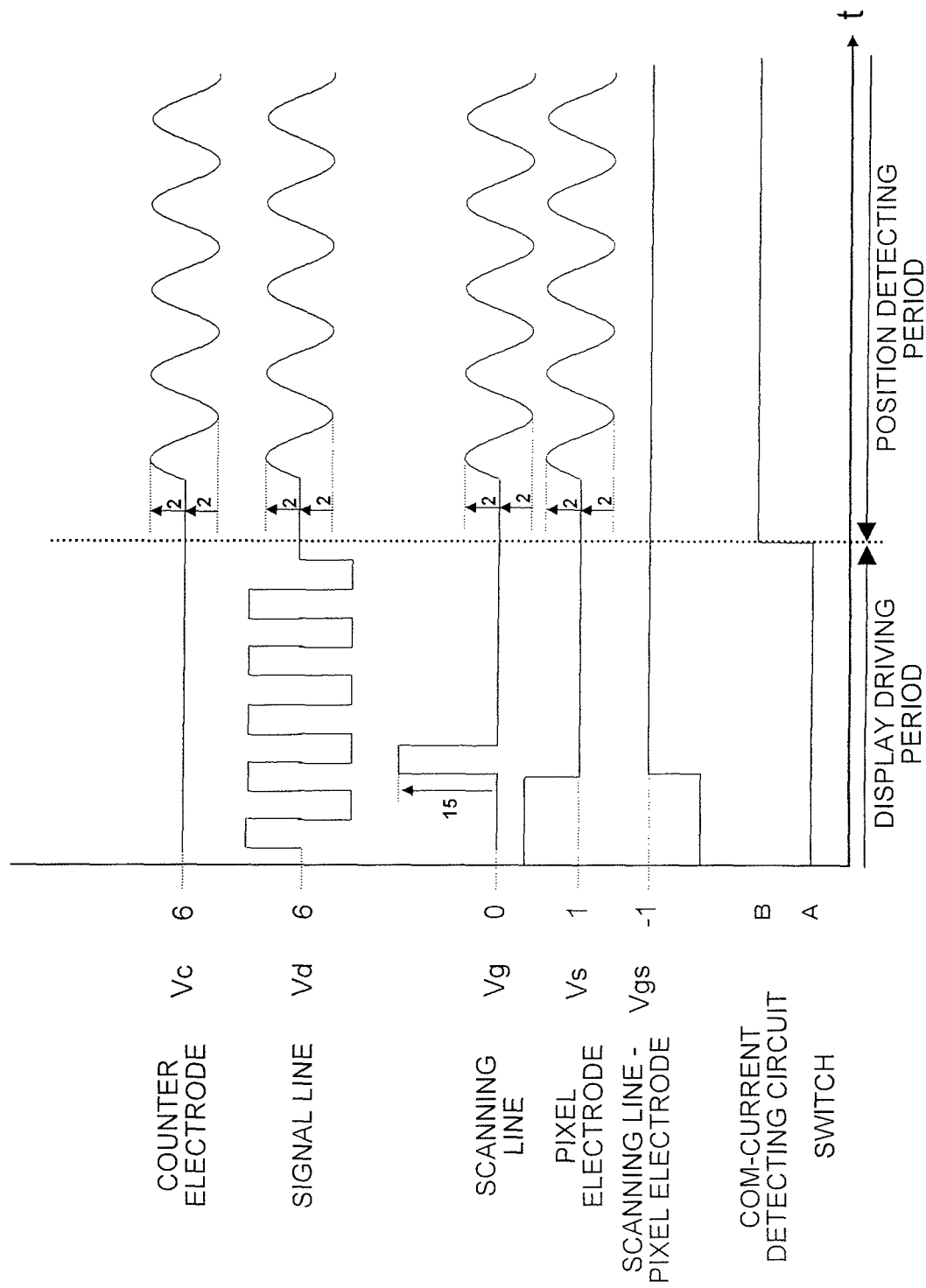
FIG. 19 is a timing chart showing voltages of each part of the touch sensor device according to the tenth exemplary embodiment.

FIG. 19 is a timing chart showing voltages of each part of the touch sensor device 1I according to the tenth exemplary embodiment. The voltage of the counter electrode 112 is shown as Vc, the voltage of the signal line 104 is shown as Vd, the voltage of the scanning line 106 is shown as Vg, and the voltage of the pixel electrode 105 is shown as Vs, respectively. The difference between the voltage Vg of the scanning line 106 and the voltage Vs of the pixel electrode 105 is shown as Vgs. The counter electrode 112, the signal line 104, the scanning line 106, and the pixel electrode 105 are electrically connected to the common electrode COM or the current detecting circuit 29 via the wirings. For changeover of the common electrode COM or the current detecting circuit 29, the COM-current detecting circuit changeover switch part 121 is used.

Further, it is structured to have a position detecting period after a display driving period. While examples of each voltage are shown in the chart, numerical values thereof are not particularly inserted since the value of the voltage Vd of the signal line 104 varies depending on the written signal. Referring to the voltage timing chart shown in FIG. 19, each scanning line 106 is in high impedance during a position detecting period, and is capacitance-coupled with the counter electrode 112. Therefore, the voltage Vg of the scanning line 106 fluctuates with the same amplitude as that of the voltage of the counter electrode 112. As described above, it is possible with the tenth exemplary embodiment to achieve the same operational effects as those of the first exemplary embodiment. At the same time, the parasitic capacitance from the counter electrode 112 side can be made extremely small when applying the AC voltage to the counter electrode 112, since the circuit (pixel electrode 105 or the like) inside the pixel matrix becomes high impedance with respect to the outer circuit in the position detecting period. Specifically, the parasitic capacitance with the tenth exemplary embodiment can be decreased as small as 100 pF, for example, whereas the parasitic capacitance with a related technique is 15 nF, for example. As a result, the S/N ratio of the signals outputted from the current detecting circuit 29 can become 150 times as large such as $6 \times 10^{-2}$ with the tenth exemplary embodiment, whereas it is $4'10^{-4}$ with the related technique, for example.

Further, during the position detecting period, the gate voltage and the source voltage of the TFT 111 both change with the same amplitude as that of the voltage of the counter electrode 112. Thus, a relative difference between the gate voltage and the source voltage becomes constant, so that Vgs of the transistor does not fluctuate. This makes it possible to achieve such a special effect that the influence for degrading the picture quality by the drive during the position detecting period can be suppressed to minimum.

Note here that n-channel type TFTs are used for the high-impedance switch parts 116, 117, and 118 for providing an electrically high impedance state between the inside and the outside the display region 103. However, the high-impedance switch part may be of p-channel type TFT or may be a transfer gate that is a combination of the n-channel type and the p-channel type. Other structures, operations, and effects are the same as those of the first exemplary embodiment.

(Eleventh Exemplary Embodiment)

Figure 20:
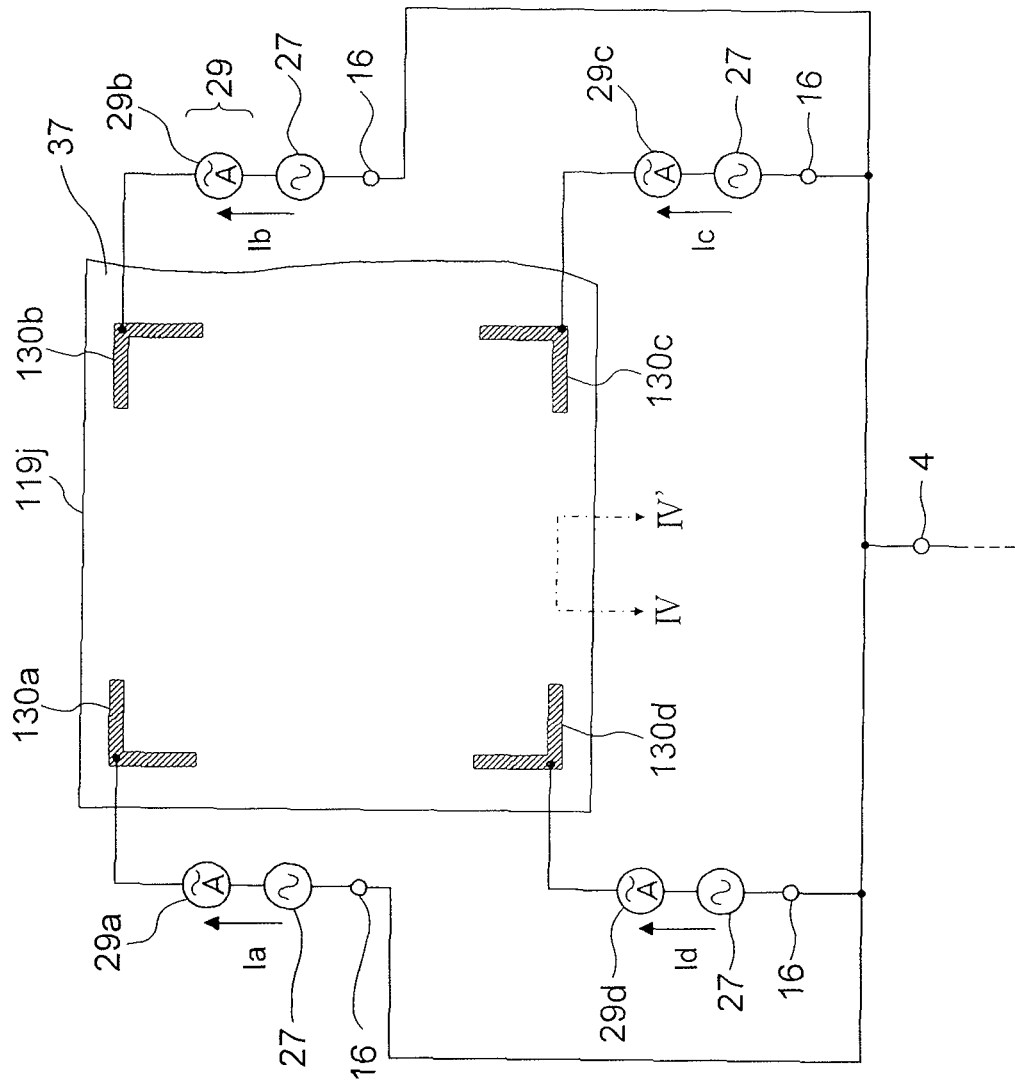
FIG. 20 is a plan schematic view showing a counter substrate of a touch sensor device according to an eleventh exemplary embodiment.
Figure 21:
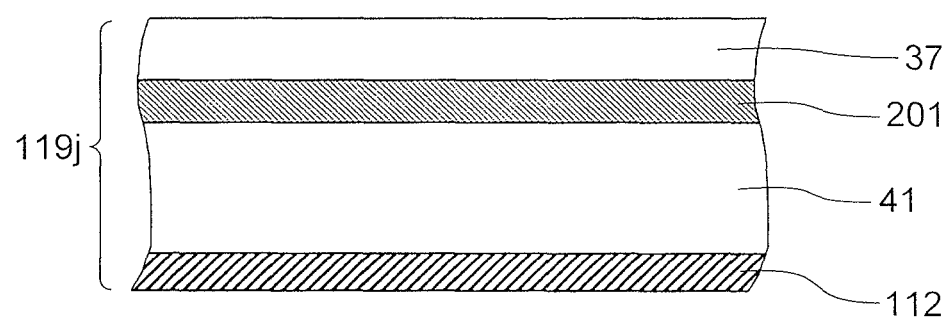
FIG. 21 is a cross-sectional schematic view taken along a line IV-IV' of FIG. 20.

Next, an eleventh exemplary embodiment of the present invention will be described by referring to FIG. 20 and FIG. 21. Hereinafter, same reference numerals as those of the tenth exemplary embodiment are used for substantially the same structural elements as those of the tenth exemplary embodiment, and only different points from those of the tenth exemplary embodiment will be described. FIG. 20 is a plan schematic view showing a counter substrate of an LCD to which the touch sensor device according to the eleventh exemplary embodiment is built-in. FIG. 21 is a fragmentary sectional view taken along a line IV-IV' of FIG. 20.

The touch sensor device of the eleventh exemplary embodiment is characterized to include a switch part (see the tenth exemplary embodiment) which simultaneously applies the AC voltage that is applied to an impedance face (201) also to a counter electrode 112 and a storage capacitance line (see the tenth exemplary embodiment). That is, the eleventh exemplary embodiment has a specific feature in its counter substrate 119*j*.

In the tenth exemplary embodiment, the counter electrode 112 of the LCD is used as a touch sensor during a position detecting period to make the display region electrically high impedance with respect to the outside the display region. As a result, even though the parasitic capacitance of the counter electrode 112 is decreased, the parasitic capacitance from the counter electrode 112 side is still much larger than the capacitance generated due to a touch.

In the meantime, referring to FIG. 21, a position detecting conductive layer 201 made with a transparent conductive layer is formed on an insulating substrate 41 formed on the lower side of the counter electrode 112 in the eleventh exemplary embodiment. This position detecting conductive layer 201 is utilized as a part of the touch panel. Further, an insulating protective layer 37 is formed on the position detecting conductive layer 201. Note here that it is preferable to use a polarizing plate as the protective layer 37.

Referring to FIG. 20, electrodes 130*a*-130*e* are formed respectively at four corners of the position detecting conductive layer 201, and current detecting circuits 29*a*-29*d* are electrically connected to each of the electrodes 130*a*-130*d*. Further, an AC voltage supply 27 is electrically connected via the current detecting circuits 29*a*-29*d*.

Compared to the transparent conductive layer of the counter electrode 112 of the tenth exemplary embodiment, the position detecting conductive layer 201 is farther from the TFT substrate and closer to the touch point. Thus, compared to the case of the counter electrode 112, the parasitic capacitance from the position detecting conductive layer 201 side is lower, and the capacitance generated due to the touch is larger. As a result, S/N of the touch sensor device can be improved.

However, there is an issue that the fluctuation in the parasitic capacitance from the position detecting conductive layer 201 is greater with respect to the capacitance generated due to the touch. Particularly, fluctuations generated according to the display contents of the LCD are the issues. This is due to the dielectric anisotropy of the liquid crystal molecules. This is an issue generated based on the principle that the alignment changes depending on the display contents and it affects the parasitic capacitance of the position detecting conductive layer 201. This results in making it difficult for the signal processing circuit to detect occurrence of touches. That is, this makes it difficult for the signal processing circuit to judge whether there is a change in the signals because of the touch of the finger or because a change in the display contents.

Figure 22:
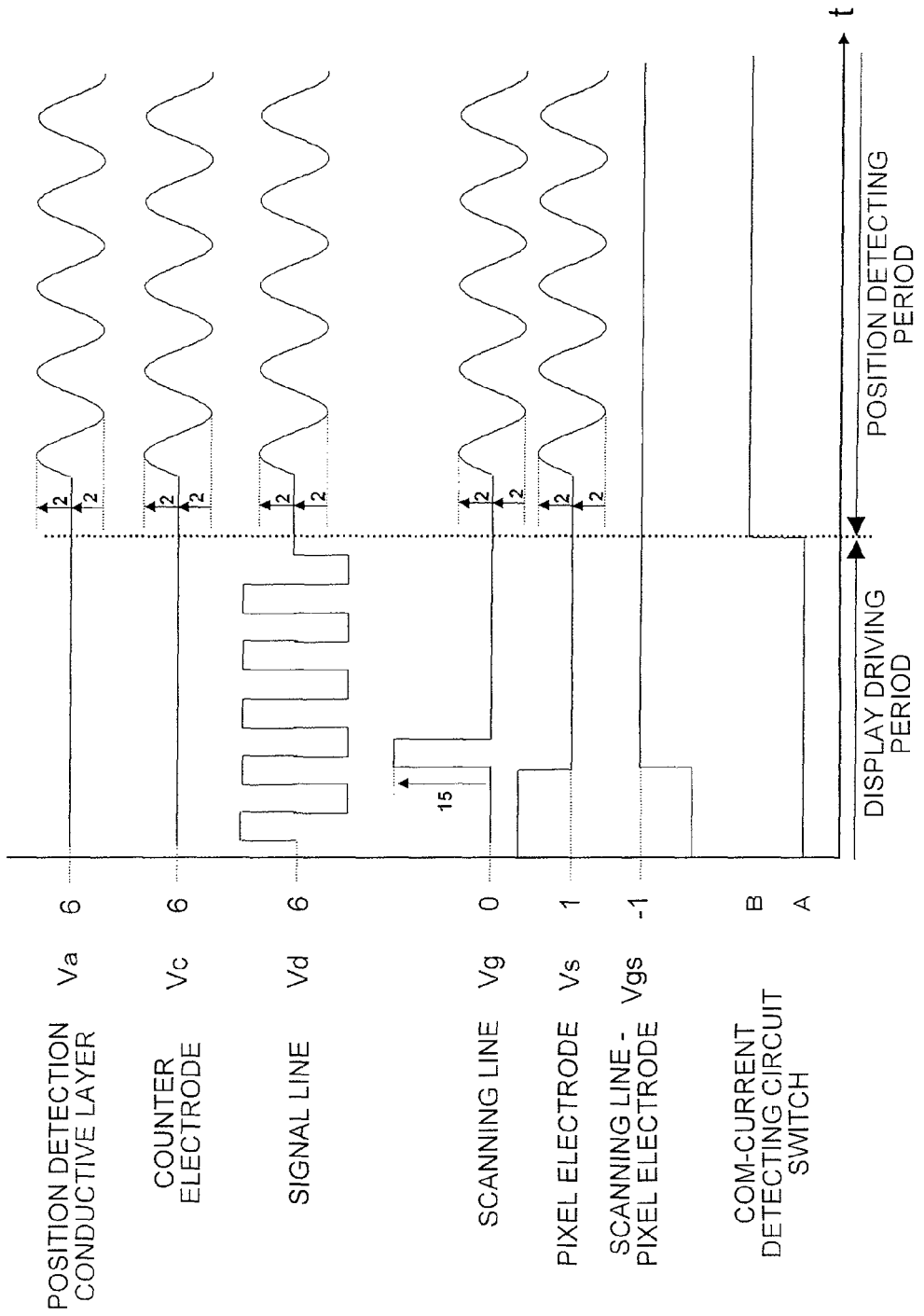
FIG. 22 is a timing chart showing voltages of each part of the touch sensor device according to the eleventh exemplary embodiment.

FIG. 22 is a timing chart showing voltages of electrode of the LCD according to the eleventh exemplary embodiment. The voltage of the position detecting conductive layer 201 is shown as Va in FIG. 22. For other voltages, the same reference codes as those of the tenth exemplary embodiment are allotted, and are in the same voltage values. Va is the voltage of the AC voltage supply 27, and the in-phase and same-amplitude voltage as that of Va is applied as the voltage Vc of the counter electrode 112. As a result, the counter electrode 112 can function as an idealistic shield layer for the position detecting conductive layer 201, thereby making it difficult to be influenced by fluctuations in the capacitance of the TFT substrate from the counter electrode 112 side generated due to dielectric constant fluctuations of a dielectric body existing between the counter electrode 112 and the TFT substrate.

As a result, the parasitic capacitance (more precisely, signals detected as the parasitic capacitance) of the position detecting conductive layer 201 is decreased notably. Further, the fluctuations in the capacitance generated depending on the display contents of the LCD can be made smaller than the fluctuations of the capacitance formed between the finger of the human body and the position detecting conductive layer 201, which makes it possible to detect occurrence of touches accurately. Other structures, operations, and effects are the same as those of the tenth exemplary embodiment.

(Twelfth Exemplary Embodiment)

Figure 23:
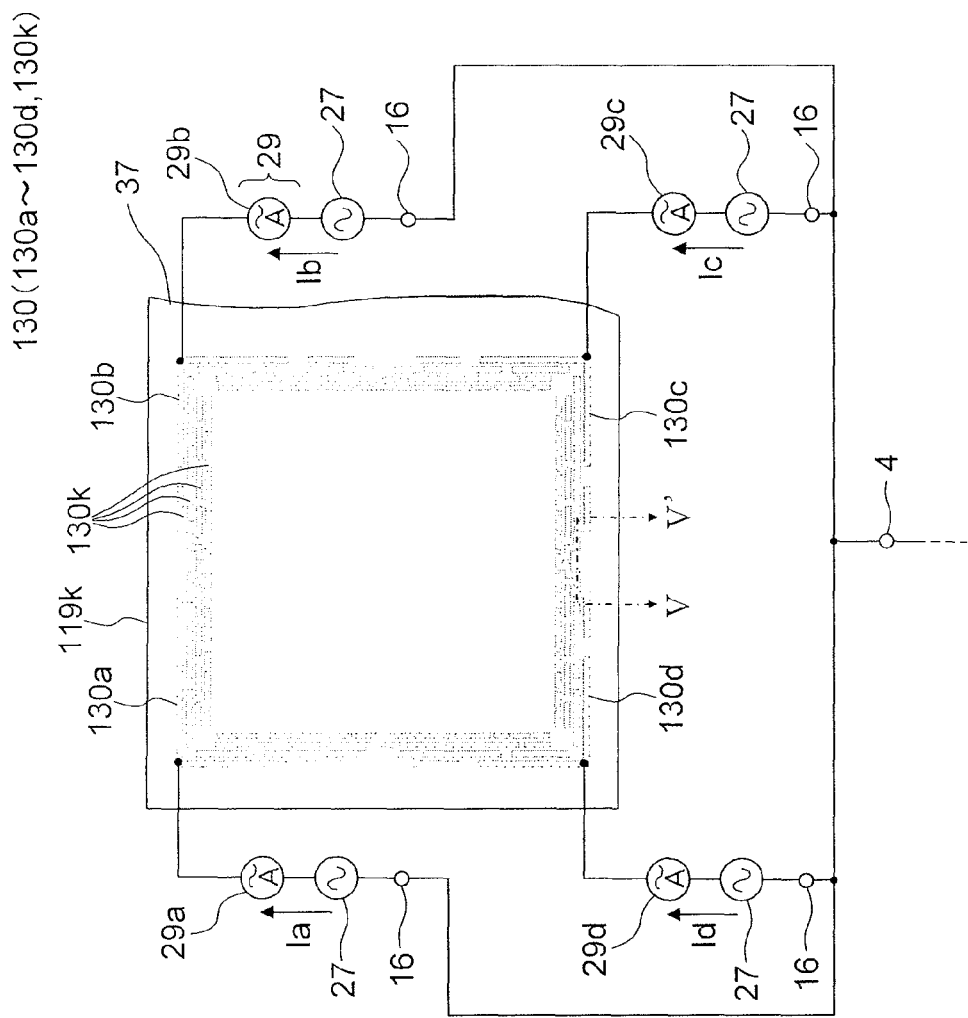
FIG. 23 is a plan schematic view showing a counter substrate of a touch sensor device according to a twelfth exemplary embodiment.
Figure 24:
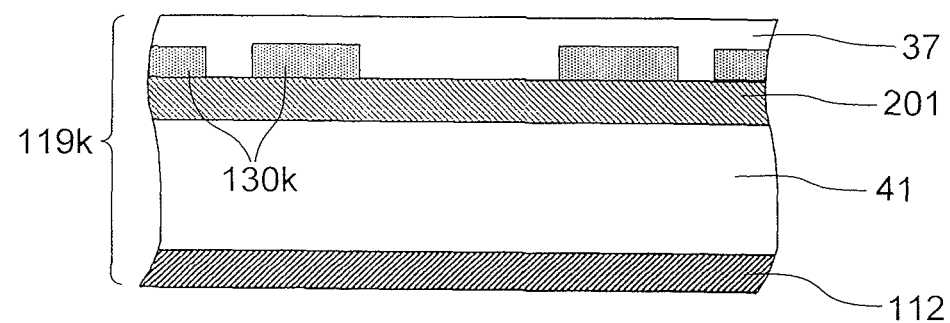
FIG. 24 is a cross-sectional schematic view taken along a line V-V' of FIG. 23.

Next, a twelfth exemplary embodiment of the present invention will be described by referring to FIG. 23 and FIG. 24. Hereinafter, same reference numerals as those of the eleventh exemplary embodiment are used for substantially the same structural elements as those of the eleventh exemplary embodiment, and only different points from those of the eleventh exemplary embodiment will be described. FIG. 23 is a plan schematic view showing a counter substrate of an LCD to which a touch sensor device according to the twelfth exemplary embodiment is built-in. FIG. 24 is a fragmentary sectional view taken along a line V-V' of FIG. 23.

The touch sensor device of the twelfth exemplary embodiment is characterized to have a linearization pattern 130 for setting potential distribution of an impedance face (201), which is provided on the top face of the impedance face (201). That is, the twelfth embodiment has a special feature in its counter substrate 119*k*. In the eleventh exemplary embodiment, the AC voltage is simply applied to the position detecting conductive layer 201 from the four corners. In that case, electric field curves distributed on the position detecting conductive layer 201 become warped to be nonuniform, which becomes an obstacle for improving the detecting accuracy of the position touched by a finger or the like. Thus, with the twelfth exemplary embodiment, as shown in FIG. 23, electrodes 130*k* are formed in the circumferential part of the position detecting conductive layer 201 so that linear equipotential lines are distributed at equal intervals on the position detecting conductive layer 201. Hereinafter, the electrodes 130*a*-130*d* at the four corners of the position detecting conductive layer 201 and the electrodes 130*k* in the circumferential part are called the linearization pattern 130 as the generally term thereof.

Next, the operational effects of the linearization pattern 130 will be described. The linearization pattern 130 makes it possible to decrease the resistance in a partial region of the position detecting conductive layer 201. In general, compared to the resistance of the transparent conductive layer which forms the position detecting conductive layer 201, the resistance of the region where the linearization pattern 130 is formed is lower. This is because the resistance in the region where the linearization pattern 130 is formed is considered as a synthesized resistance obtained by parallel-connecting the resistance of the position detecting conductive layer 201 and the resistance of the linearization pattern 130, so that it becomes lower than the resistance of the position detecting conductive layer 201 regardless of the value of the resistance of the linearization pattern 130.

In this manner, the linearization pattern 130 decreases the resistance in the corresponding region of the position detecting conductive layer 201. The purpose thereof is to keep the potential of the circumferential region of the position detecting conductive layer 201 to be in the same potential even when the potential of the region of the position detecting conductive layer 201 corresponding to a touch part is decreased due to capacitance-coupling generated when a finger touches the surface of the LCD. There is a voltage drop generated in the circumferential range for the AC voltage at the four corners of the position detecting conductive layer 201. However, the voltage drop is adjusted at an arbitrary point in the circumferential region by adjusting the resistance from the vicinity of the four corners of the position detecting conductive layer 201 to the arbitrary point in the circumferential region. The adjustment of the resistance from the regions in the vicinity of the four corners to the arbitrary point on a side neighboring to the four corners is conducted by combining the low resistance region where the linearization pattern 130 is provided and the high resistance region where the linearization pattern 130 is not provided.

Next, a method for manufacturing the linearization pattern 130 will be described. It is preferable to form the electrodes 130*a*-130*d* at the four corners of the position detecting conductive layer 201 and the electrode 130*k* in the circumferential part with a same step. A conductive paste is used as a material, and it is applied by screen printing, dispensing, or the like. Then, it is calcined and cured. As the conductive paste, specifically, a conductive resin or the like is used. As an additive (filler) of the conductive resin material, silver, carbon, or graphite is used. For the resin material, polyester or acryl is used.

Further, it is preferable to provide a front shield on the linearization pattern 130. The front shield is structured to sandwich the linearization pattern with an insulator such as a vinyl chloride resin or polyimide, for example. This provides an effect of decreasing the parasitic capacitance between the linearization pattern and the palm other than the finger on the touching side or the other hand, etc. This is because it is possible to decrease the relative dielectric constant with the insulator that covers the linearization pattern by thickening the thickness of the insulator and by the material to be used.

Further, it is also possible to provide a front shield by a conductive layer that is different from the linearization pattern. For example, a sheet in which copper foil is sandwiched by a vinyl chloride resin or the like is formed in a frame form on the electrodes at the four corners and the top face of the linearization pattern. In order to decrease the floating capacitance which influences the electrodes on the four corners and the linearization pattern from the touching face side, this copper foil within the front shield of this structure is connected to the ground.

Through forming the linearization pattern in the manner described above, the electric field curves distributed on the position detecting conductive layer (transparent conductive layer) are rectified. With this, linear equipotential lines can be distributed on the position detecting conductive layer (transparent conductive layer) at equivalent intervals. This makes it possible to provide such an effect that the position touched by a finger or the like can be detected accurately.

The twelfth exemplary embodiment has been described by referring to the case where the position detecting conductive layer 201 is provided on the upper part of the counter electrode 112 and the touch sensor device is built-in to the LCD. However, it is also possible to be applied to a case where the LCD and the touch sensor device are formed as separate bodies, as in the cases shown in the first to ninth exemplary embodiments. Other structures, operations, and effects are the same as those of the eleventh exemplary embodiment.

(Thirteenth Exemplary Embodiment)

Figure 25:
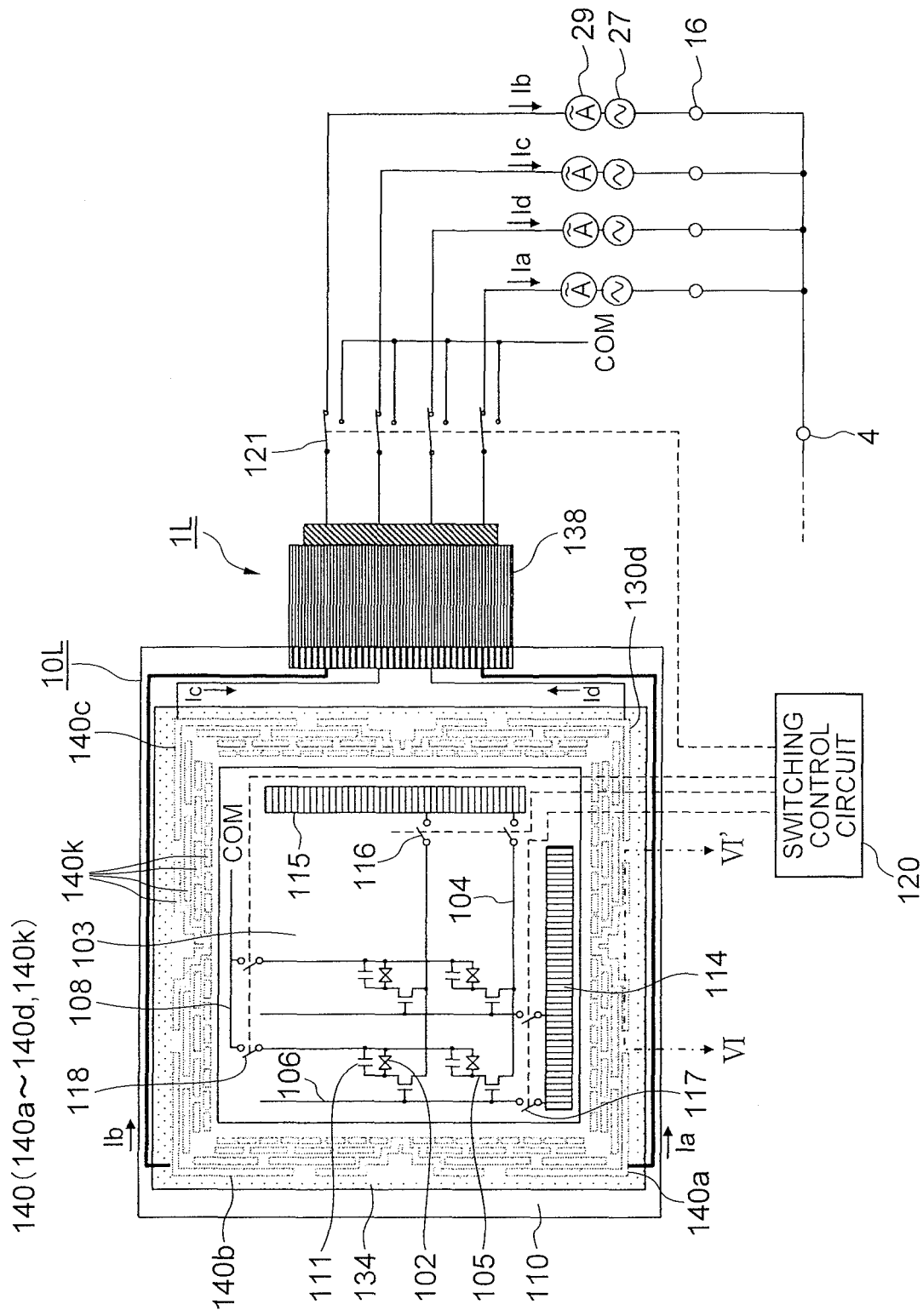
FIG. 25 is a plan schematic view of an LCD to which a touch sensor device according to a thirteenth exemplary embodiment is loaded.
Figure 26:
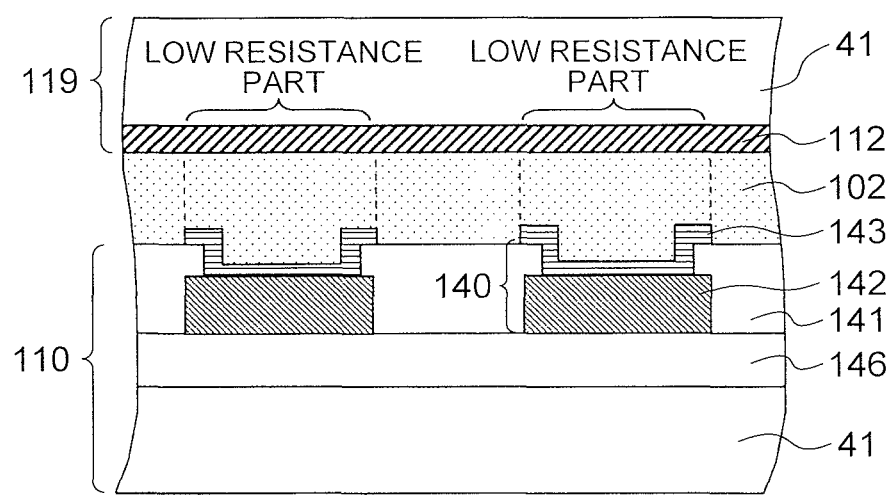
FIG. 26 is a cross-sectional schematic view taken along a line VI-VI' of FIG. 25.

Next, a thirteenth exemplary embodiment of the present invention will be described by referring to FIG. 25 and FIG. 26. Hereinafter, same reference numerals as those of the tenth and twelfth exemplary embodiments are used for substantially the same structural elements as those of the tenth and twelfth exemplary embodiments, and only different points from those of the tenth and twelfth exemplary embodiments will be described. FIG. 25 is a plan schematic view of the LCD to which a touch sensor device according to the thirteenth exemplary embodiment is loaded. FIG. 26 is a fragmentary sectional view taken along a line VI-VI' of FIG. 25. In FIG. 25, illustration of a counter substrate is omitted.

A touch sensor device 1L of the thirteenth exemplary embodiment is mounted into an LCD 10L that is in a three-layer structure formed with a counter electrode 112, a liquid crystal element 102, and a pixel electrode 105. The counter electrode 112 is used also as the impedance face, the pixel electrode 105 is formed on a TFT substrate 110, a linearization pattern 140 for setting the potential distribution of the impedance face (counter electrode 112) is provided on the TFT substrate 110, and it is electrically connected to the impedance face (counter electrode 112) via an anisotropic conductor 134. The linearization pattern 140 is formed with electrodes 140*a*-140*d* at the four corners of the TFT substrate 110 and electrodes 140*k* in the circumferential part.

With the twelfth exemplary embodiment described above, when the linearization pattern is formed by using a conductive paste by screen printing or the like, the number of manufacturing steps is increased. Further, a manufacturing device and an expensive material such as a conductive paste are required. This becomes an obstacle for decreasing the manufacturing cost of the LCD to which the touch sensor function is built-in.

In the meantime, with the thirteenth exemplary embodiment, the linearization pattern 140 is formed on the TFT substrate 110, and the linearization pattern 140 is electrically connected with the counter electrode 112 via the anisotropic conductor 134. As described, through electrically connecting the linearization pattern 140 on the TFT substrate 110 with the counter electrode 112 via the anisotropic conductor 134, the linearization pattern 140 and the counter electrode 112 are connected with low impedance but the divided linearization patterns 140 are not connected with low impedance since the counter electrode 112 corresponding to the shape of the linearization pattern 140 is in the perpendicular direction of the linearization pattern 140. In this manner, it is possible to provide the same function as that of the structure of the twelfth exemplary embodiment in which the linearization pattern is formed with a conductive paste on the counter electrode 112 (transparent conductive layer).

In the meantime, the linearization pattern 140 is formed with a stacked layer of an aluminum layer 142 (drain of TFT 111) and a transparent conductive layer 143 (pixel electrode 105) on the TFT substrate 110. The aluminum layer 142 and the transparent conductive layer 143 are electrically connected via contact holes formed on an insulating layer 141. In the meantime, the TFT 111 is normally formed by repeating deposition and photolithography. The aluminum layer 142 and the transparent conductive layer 143 forming the linearization pattern 140 and the insulating layer 141 with the contact holes can also be formed simultaneously with the TFT 111. That is, it is not necessary to add a manufacturing step since it simply needs to add design information of the linearization pattern 140 to the design information of the photo mask of photolithography for forming the TFT 111.

Further, while the liquid crystal element 102 is sandwiched between the TFT substrate 110 and the counter substrate 119, and the periphery of the liquid crystal element 102 is sealed by a seal (not shown), an anisotropic conductor may be used as the material of this seal, and the linearization pattern 140 formed on the TFT substrate 110 may be connected to the counter electrode 112 via the seal. With this, the space used exclusively for the anisotropic conductor can be saved, so that the frame of the LCD 10L can be narrowed. Through the above, it is possible to decrease the manufacturing cost of the LCD 10L to which the touch sensor device 1L is built-in, while improving the detecting accuracy of the touch position. Other structures, operations, and effects are the same as those of the tenth and twelfth exemplary embodiments.

(Fourteenth Exemplary Embodiment)

Figure 27A:
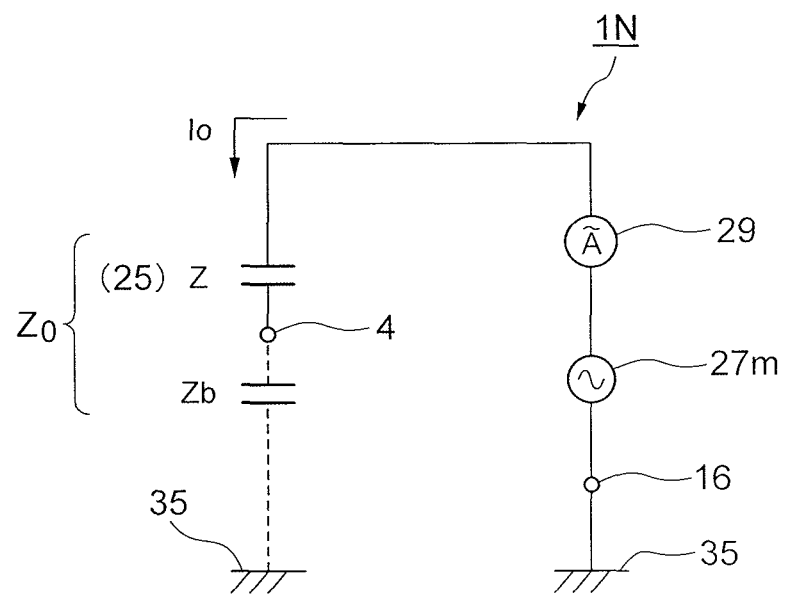
FIG. 27A is an equivalent circuit diagram showing an operation principle of a typical touch sensor device.
Figure 27B:
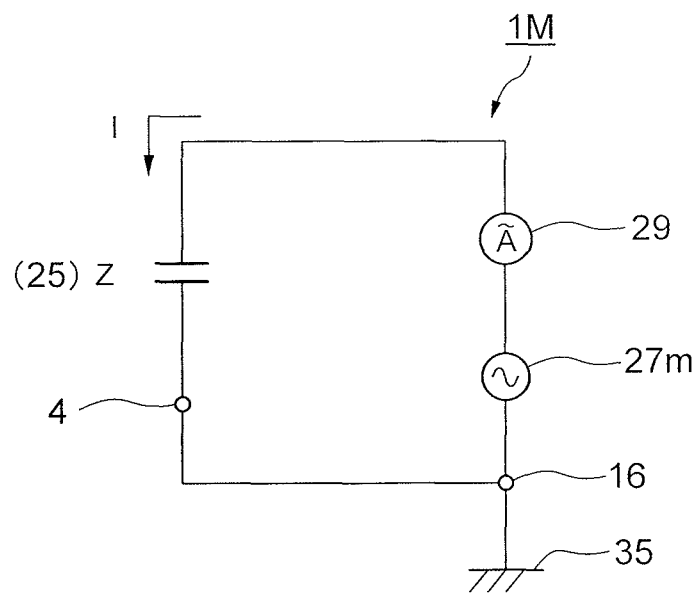
FIG. 27B is an equivalent circuit diagram showing an operation principle of a touch sensor device according to a fourteenth exemplary embodiment.

Next, a fourteenth exemplary embodiment of the present invention will be described by referring to FIG. 27. Hereinafter, same reference numerals as those of the first exemplary embodiment are used for substantially the same structural elements as those of the first exemplary embodiment, and only different points from those of the first exemplary embodiment will be described. FIG. 27A is an equivalent circuit diagram showing an operation principle of a typical touch sensor device. FIG. 27B is an equivalent circuit diagram showing an operation principle of a touch sensor device according to the fourteenth exemplary embodiment.

In each of the exemplary embodiments above, described are the cases where the touch sensor device is used while not being connected to the AC socket. In the meantime, in the fourteenth exemplary embodiment, described is a case where the touch sensor device is used while being connected to an AC socket.

A touch sensor device 1N shown in FIG. 27A is a typical one which is used while being connected to an AC socket, and the operation principle thereof is as in the explanation provided by referring to FIG. 5A. A reference potential node 16 is connected to an earth 35.

A power supply part 27m in a touch sensor device 1M shown in FIG. 27B includes a DC stabilizing supply which acquires an AC voltage from an AC socket and converts it to a DC voltage or a transformer which acquires an AC voltage from the AC socket and transforms the voltage value, etc. The reference potential node 16 of the circuit is connected to the earth 35 also while the touch sensor 1M is being used. The power supply part 27m also outputs an AC voltage like the power supply parts of the other exemplary embodiments. That is, the touch sensor device 1M is equivalent to the device that is obtained by replacing the power supply part 27 (see the respective drawings) of the touch sensor device of each of the above-described exemplary embodiments with the power supply part 27m.

Impedance Z of the typical touch sensor device 1N is synthesized impedance Zo of impedance Z of the capacitance 25 and parasitic impedance Zb between the human body 4 and the earth 35 connected thereto in series. In the meantime, the impedance in the fourteenth exemplary embodiment is only the impedance Z of the capacitance 25. This is because the reference potential node 16 is the same potential as that of the human body 4 as described above in each of the exemplary embodiments and also the same potential as that of the earth 35, so that the parasitic impedance between the human body 4 and the earth 35 can be ignored. That is, since Z<Zo applies, the relation between the currents flown in the both can be expressed as I>Io.

With the touch sensor device 1M of the fourteenth exemplary embodiment, the impedance in a closed loop is decreased compared to the case of the typical touch sensor device 1N. Thus, the current becomes increased, thereby making it possible to improve the current detecting accuracy.

While the present invention has been described by referring to the specific exemplary embodiments by referring to the accompanying drawings thereof, the present invention is not limited only to those exemplary embodiments. Any possible modifications that occurred to those skilled in the art can be applied to the structures and details of the present invention. Further, it is to be understood that the present invention includes various combinations of a part of or the entire part of the structures of each of the exemplary embodiments.

Furthermore, the present invention can also be structured as follows.

(1) A surface-capacitive type touch sensor device, which includes: a touch sensor function for sensing occurrence of touch made by a human body by a capacitance formed on an impedance face; and a current detecting circuit that is electrically connected to the impedance face, wherein the current detecting circuit includes a device which receives power supplied from an external AC power supply which connects a reference potential node of the current detecting circuit and the human body with low impedance.

(2) The touch sensor device depicted in (1), wherein: a casing of a portable device to which the touch sensor device is loaded includes a conductive part; the conductive part is connected with the reference potential node with low impedance; and the conductive part is arranged on the casing in such a manner that the human body contacts with the conductive part when an operator supports the casing.

(3) The touch sensor device depicted in (1), wherein: a casing of a portable device to which the touch sensor device is loaded includes a conductive part; the conductive part is electrically connected with the reference potential node; the touch sensor device includes at least an insulating protective layer that covers the impedance face or an insulator that covers periphery of the impedance face; and an isolated distance between the conductive part and the impedance face is longer with respect to thickness of the protective layer or the insulator surrounding the periphery.

(4) The touch sensor device depicted in (1), which includes a conductive folder covering a voltage apply part or a light emission source of a device which illuminates a display device that performs electro-optic responses, wherein the folder and the reference potential node are electrically connected.

(5) The touch sensor device depicted in (1), which includes: a surface display device that is formed including a display device element that performs electro-optic response, a first conductor for supplying an electric signal to the display device element, and a second conductor for supplying an electric signal to the display device element; a counter substrate having an impedance face for supplying an electric signal to the display device element; a current detecting circuit; and a control circuit which, when the current detecting circuit detects a current, applies substantially same voltage as that of the impedance face to one of the first conductor and the second conductor and makes the other floated or applies substantially the same voltage as that of the impedance face.

(6) The touch sensor device depicted in (1), wherein: the impedance face includes a linearization pattern; a conductor is formed on an upper part of the linearization pattern; and the conductor is electrically connected to the reference potential node.

(7) The touch sensor device depicted in (1), which includes: a display device element for performing electro-optic response; a display device substrate for supplying an electric signal to the display device element; a counter substrate having an impedance face for supplying an electric signal to the display device element; a current detecting circuit; and a linearization pattern formed on the display device substrate, wherein the linearization pattern and the impedance face are connected via an anisotropic conductor.

(8) The touch sensor device depicted in (1), wherein the reference potential node and the human body are connected to decrease impedance between the reference potential node and the human body.

Further, the present invention can be summarized as follows. The object of the present invention is to provide a surface display device having a touch sensor function capable of accurately detecting occurrence of touches and touch positions suited for a portable device, while suppressing the manufacturing cost, and to provide an electronic apparatus having the same. A means for accomplishing the object of the present invention is to electrically connect the floated circuit reference potential with a part of the human body to make it in the potential of the human body under a mobile environment. Thereby, the parasitic impedance from the reference potential of the circuit to the earth can be ignored.

INDUSTRIAL APPLICABILITY

The present invention can be utilized for a surface display device which detects coordinates of a position indicated on a display surface by a finger or a pen or for a surface display device which detects presence of pointing actions. Use examples of the present invention are touch sensor functions used for game machines, portable information terminals, PDAs, car navigation systems, notebook personal computers, portable DVD players, TV game machines attached to passengers seats of airplanes and buses, and factory automation (FA) apparatuses.

What is claimed is:

1. A touch sensor device, comprising:
a first human body contact part which forms a capacitance between a human body and the first human body contact part itself when the human body makes a contact or approaches thereto:
a power supply part which outputs an AC voltage to the first human body contact part;
a current detecting part which detects a current flown from the power supply part to the human body;
a reference potential part to be a reference potential of the AC voltage; and
a second human body contact part which is electrically connected to the reference potential part and to which the human body makes a contact,
wherein:
the first human body contact part includes an impedance face formed with a conductive film to which the human body makes a contact or approaches, and a plurality of electrodes which are provided on the impedance face and to which the AC voltage is applied; and
the current detecting part includes a plurality of current detecting circuits which respectively detects currents flown in the plurality of electrodes, and
wherein provided that capacitive impedance formed between the conductive film and the human body when the human body makes a contact or approaches to the conductive film is Z, and parasitic impedance connected in series to the capacitive impedance is Zp, "$Zp/Z \leq 0.4$" applies.

2. The touch sensor device as claimed in claim 1, wherein the power supply part includes a battery which outputs a DC voltage, transforms the DC voltage to the AC voltage, and outputs the AC voltage from the first human body contact part.

3. The touch sensor device as claimed in claim 2, which is mounted into a portable device, wherein
the second human body contact part is a conductor which forms a surface of a casing of the portable device.

4. The touch sensor device as claimed in claim 3, wherein the conductor forms an entire surface of the casing except periphery of the first human body contact part.

5. The touch sensor device as claimed in claim 3, wherein the conductor is a conductive film provided on the surface of the casing.

6. The touch sensor device as claimed in claim 3, wherein:
the portable device includes a liquid crystal display, a backlight which generates light that transmits through the liquid crystal display, and a conductive folder which reflects the light generated from the backlight and guides the light to the liquid crystal display;
the first human body contact part is provided on a display face of the liquid crystal display; and
the folder and the reference potential part are electrically connected.

7. The touch sensor device as claimed in claim 2, which is mounted into a portable device, wherein
the second human body contact part includes a conducting wire connected to the reference potential part, and a conductor connected to the conducting wire.

8. The touch sensor device as claimed in claim 2, which is mounted into a portable device and further includes an indicator, wherein:
the indicator includes a point section which makes a contact with the impedance face, and a grip section grabbed by a hand of the human body; and
the point section and the grip section are both conductive and are electrically connected.

9. The touch sensor device as claimed in claim 8, wherein the point section has a same-level elasticity as that of a finger tip of the human body.

10. The touch sensor device as claimed in claim 2, which is mounted into an onboard device, wherein
the conductor is provided in a part where the human body touches while on board.

11. An onboard device, comprising the touch sensor device claimed in claim 10.

12. The touch sensor device as claimed in claim 2, which is mounted into a liquid crystal display that is in a structure in which a liquid crystal is sandwiched between a counter electrode, a pixel electrode, and wirings, wherein:
the counter electrode is used also as the impedance face; and
the touch sensor device further includes a switch part which simultaneously applies the AC voltage applied to the impedance face at least to a part of the wirings.

13. The touch sensor device as claimed in claim 2, which is mounted into a liquid crystal display that is in a structure in which a liquid crystal is sandwiched between a counter electrode, a pixel electrode, and wirings, wherein:
the counter electrode is used also as the impedance face; and
the touch sensor device further includes a switch part which has at least a part of the wirings electrically floated.

14. The touch sensor device as claimed in claim 2, which is mounted into a liquid crystal display including a counter electrode, a liquid crystal, and a pixel electrode, the touch sensor device further comprising a switch part which simultaneously applies the AC voltage that is applied to the impedance face to the counter electrode.

15. The touch sensor device as claimed in claim 2, comprising
a linearization pattern for setting potential distribution of the impedance face provided on a surface of the impedance face.

16. A portable device, comprising the touch sensor device claimed in claim 2.

17. The touch sensor device as claimed in claim 1, which is mounted into a liquid crystal display including a counter electrode, a liquid crystal, and a pixel electrode, wherein
the counter electrode is used also as the impedance face;
the pixel electrode is formed on a TFT substrate; and
a linearization pattern for setting potential distribution of the impedance face is provided on the TFT substrate, and is electrically connected to the impedance face via an anisotropic conductor.

18. An electronic device, comprising the touch sensor device claimed in claim 1.

\* \* \* \* \*